(12) United States Patent
Sharma

(10) Patent No.: US 12,514,413 B2
(45) Date of Patent: Jan. 6, 2026

(54) LAVATORY EQUIPMENT

(71) Applicant: Lalit Mohan Sharma, Bathinda (IN)

(72) Inventor: Lalit Mohan Sharma, Bathinda (IN)

(*) Notice: Subject to any disclaimer, the term of this patent is extended or adjusted under 35 U.S.C. 154(b) by 208 days.

(21) Appl. No.: 18/256,918

(22) PCT Filed: Dec. 14, 2021

(86) PCT No.: PCT/IB2021/061677
§ 371 (c)(1),
(2) Date: Jun. 10, 2023

(87) PCT Pub. No.: WO2023/111631
PCT Pub. Date: Jun. 22, 2023

(65) Prior Publication Data
US 2025/0072671 A1   Mar. 6, 2025

(51) Int. Cl.
*A47K 13/24* (2006.01)
*A61B 5/00* (2006.01)
*A61B 5/0245* (2006.01)
*A61B 5/145* (2006.01)
*A61B 5/1455* (2006.01)
*A61B 5/282* (2021.01)

(52) U.S. Cl.
CPC ............ *A47K 13/24* (2013.01); *A61B 5/0022* (2013.01); *A61B 5/0245* (2013.01); *A61B 5/14532* (2013.01); *A61B 5/14552* (2013.01); *A61B 5/282* (2021.01); *A61B 5/6891* (2013.01); *A61B 5/742* (2013.01)

(58) Field of Classification Search
CPC ............... A47K 13/24; A47K 17/028; A61B 2562/0252; A61B 5/0022; A61B 5/01; A61B 5/021; A61B 5/0245; A61B 5/1172; A61B 5/14532; A61B 5/14552; A61B 5/282; A61B 5/6829; A61B 5/6889; A61B 5/6891; A61B 5/7225; A61B 5/742; A61B 5/746; A61B 5/747; G16H 40/63; G16H 40/67; G16H 50/30
See application file for complete search history.

(56) References Cited

U.S. PATENT DOCUMENTS

2018/0020984 A1* 1/2018 Hall ................ A61B 5/318
600/301

FOREIGN PATENT DOCUMENTS

| CN | 109893105 A | 6/2019 |
|---|---|---|
| IN | 305597 A1 | 1/2019 |

OTHER PUBLICATIONS

International Search Report in International Application PCT/IB2021/061677, mailed on Feb. 11, 2022.
(Continued)

*Primary Examiner* — George Manuel
(74) *Attorney, Agent, or Firm* — Hayes Soloway, PC

(57) ABSTRACT

The present invention relates to a lavatory equipment enabled for simultaneous assessment and diagnosis of a plurality of vital parameters of human body. The lavatory equipment comprises a toilet seat installed with a plurality of sensors, a seat ring mounted over the toilet seat, a microcontroller unit, a display unit, a finger-print sensor, an ECG electrode unit positioned on a seat ring, a blood glucose sensor, a blood pressure sensor, an electromechanical switch and an emergency push switch.

16 Claims, 20 Drawing Sheets

(56) References Cited

OTHER PUBLICATIONS

Written Opinion of the International Search Authority in the International Application PCT/IB2021/061677, mailed on Feb. 11, 2022.
Katie Pfaff "A 90-second sit on the Heart Seat could capture patient vital signs for monitoring chronic conditions." Oct. 4, 2021, whole document.
Joji Inamasu, "Cardiac Arrest in the Toilet: Clinical Characteristics and Resuscitation Profiles", Article, 2013, 130-135, vol. 18, Environmental Health and Preventive Medicine.

* cited by examiner

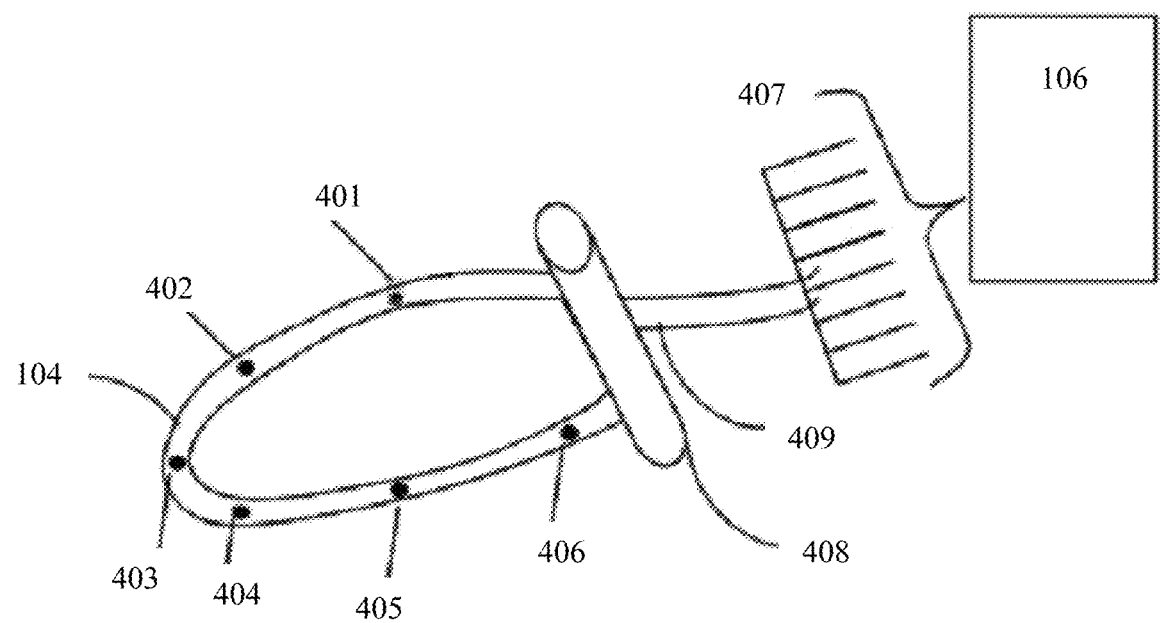
Fig. 4A Load cell arrangement (top view)
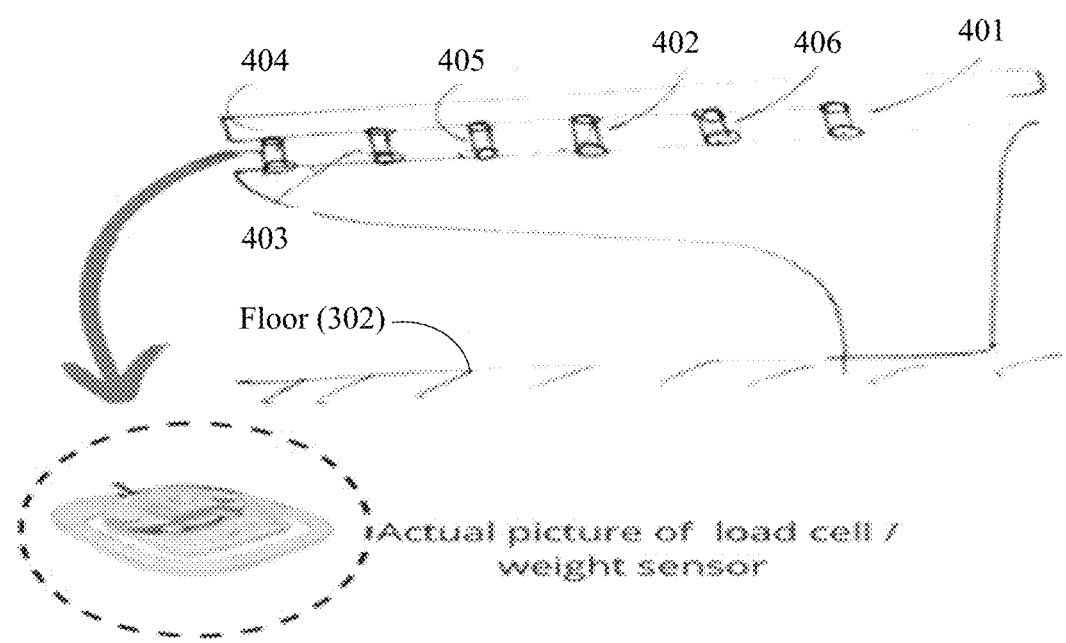
Fig. 4B Load cell arrangement (side view)

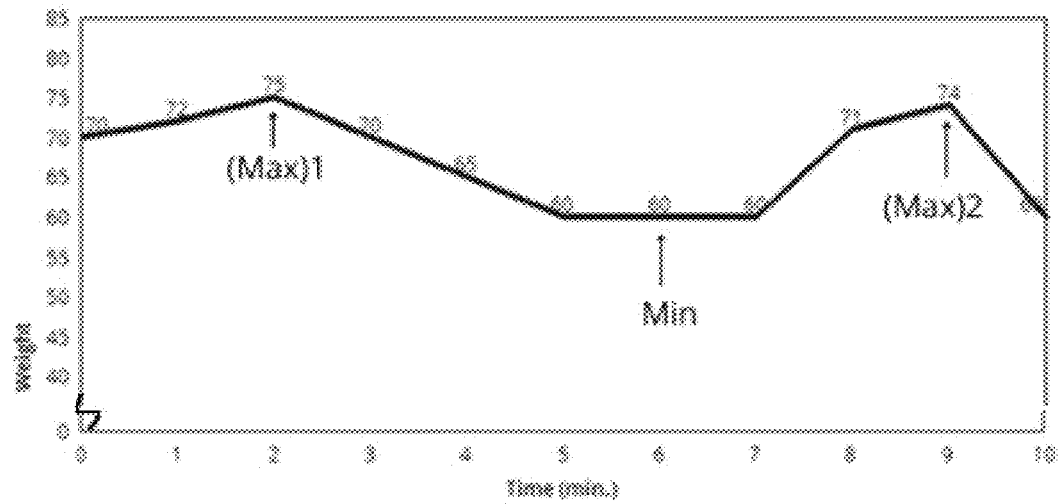
Fig. 6A
Fig. 6B
Fig. 6C

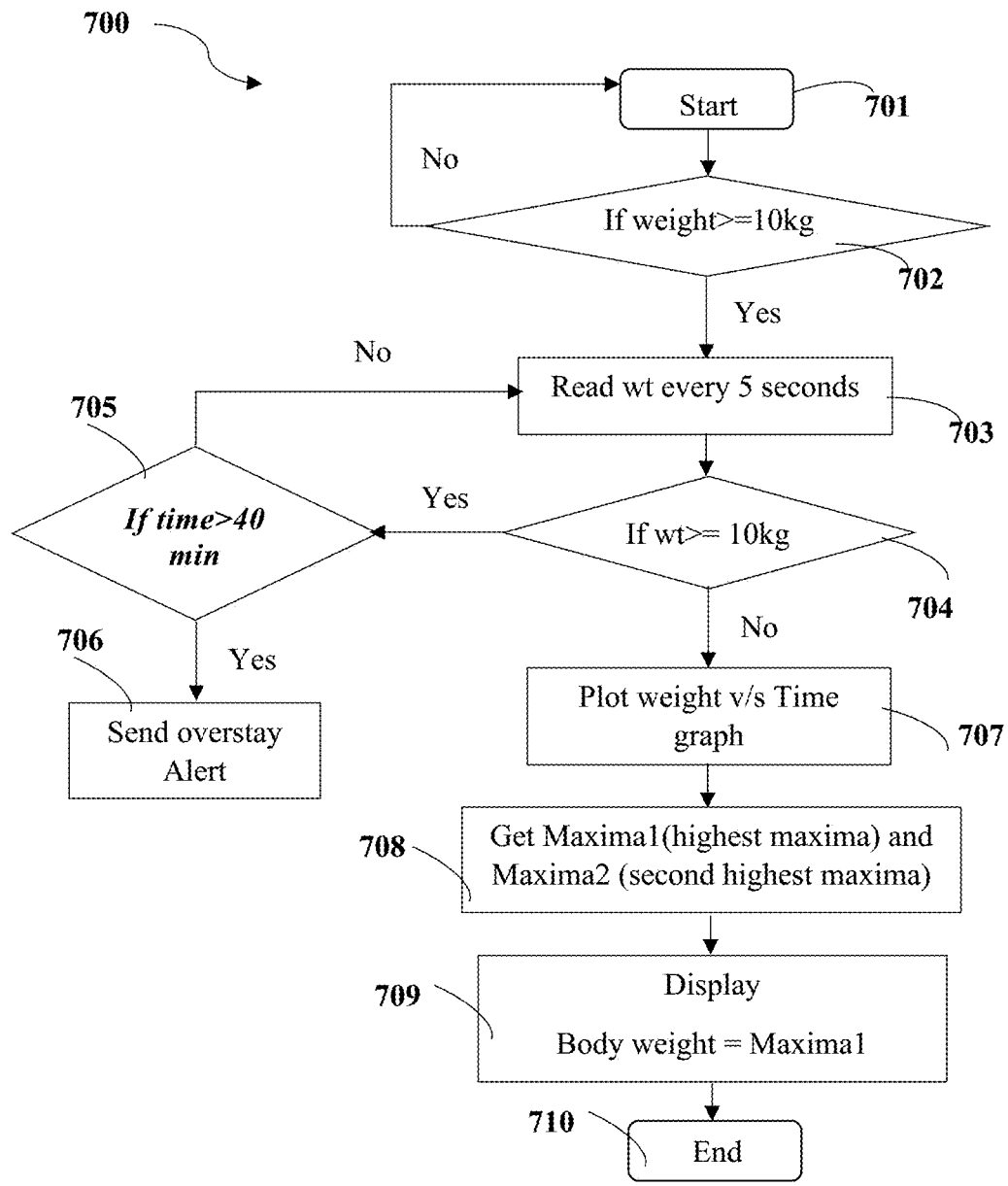
Fig. 7 Weight Flowchart

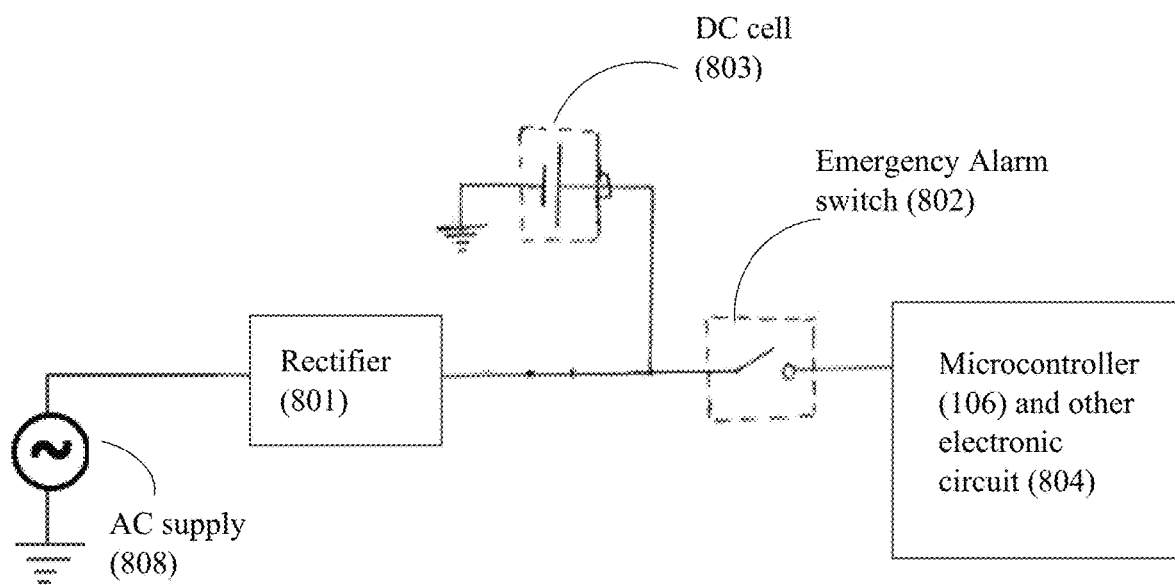
Fig. 8A Emergency alarm switch
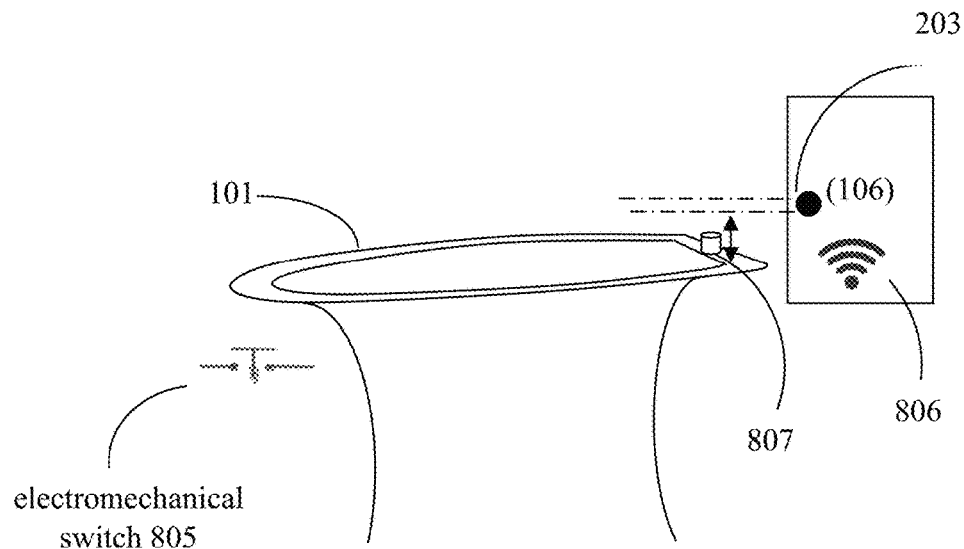
Fig. 8B Electromechanical switch

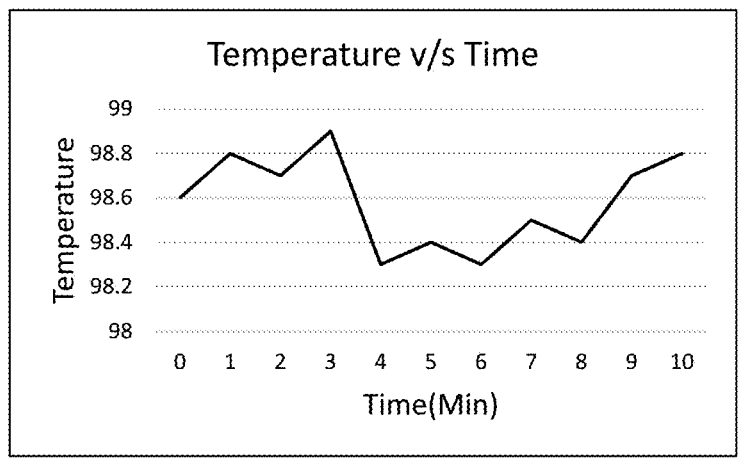
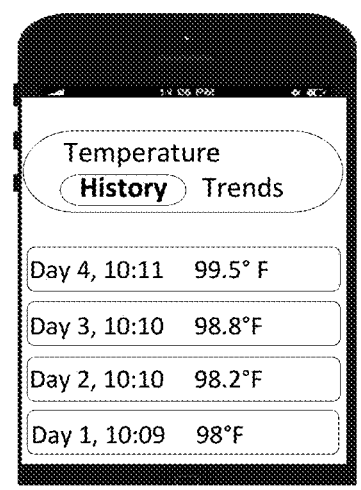
Fig. 9A
Fig. 9B
Fig. 9C

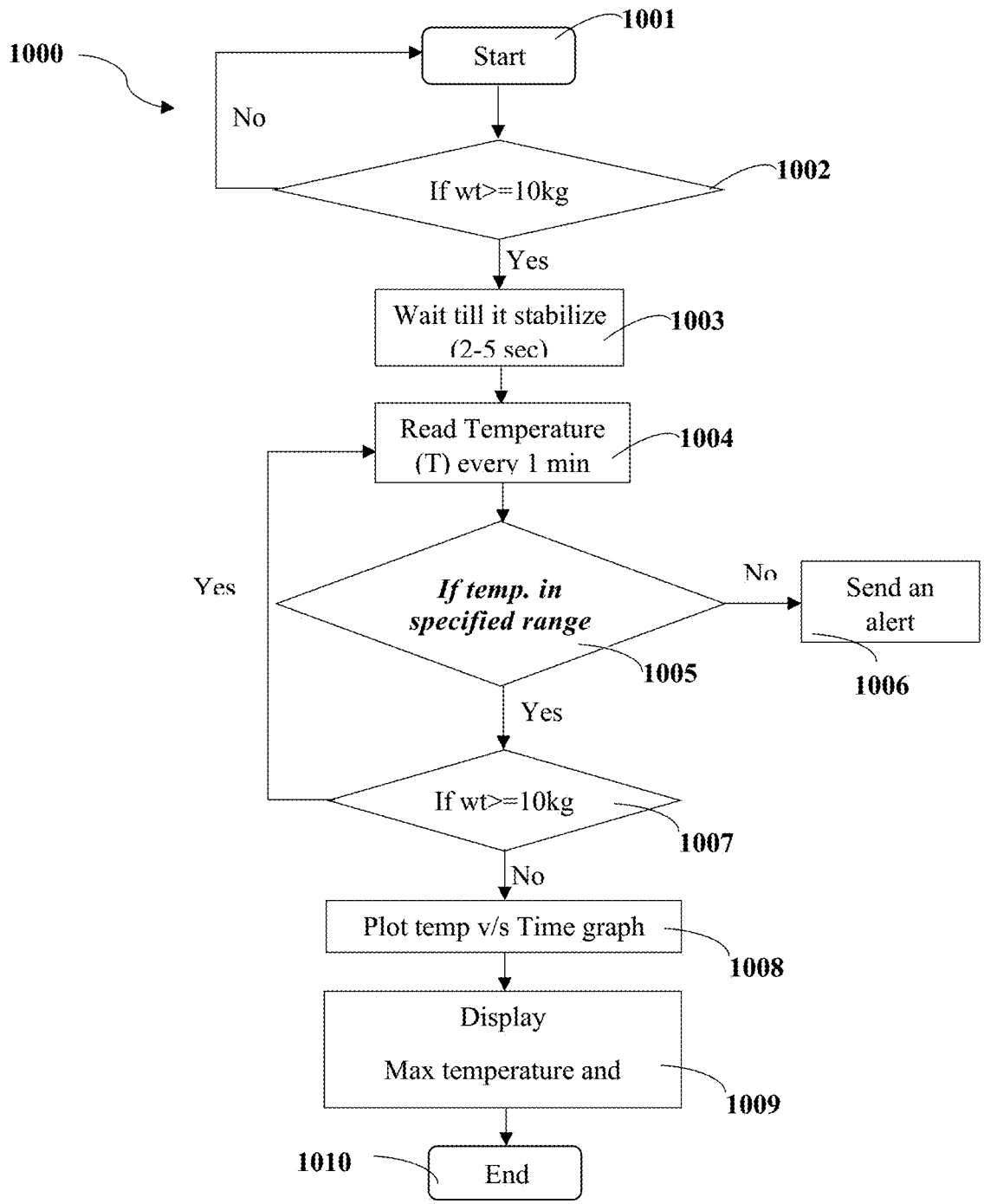
Fig. 10 Temperature analysis flowchart

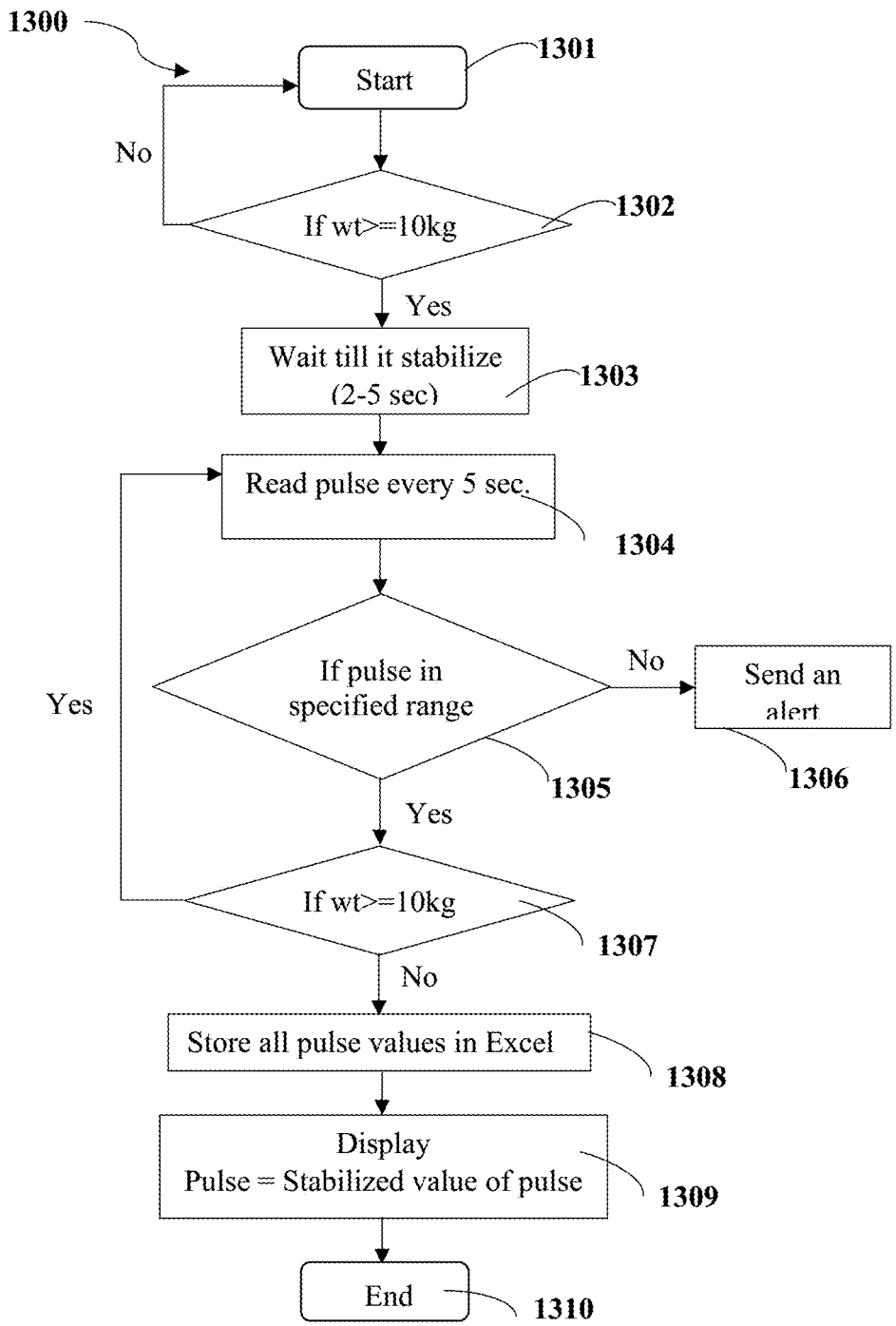
Fig. 13 Pulse flowchart

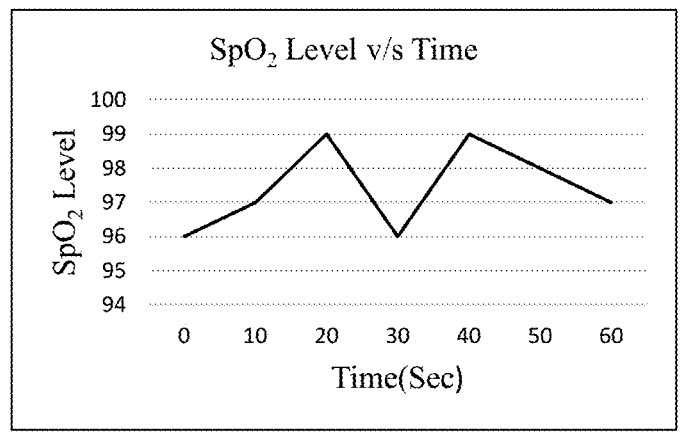
Fig. 14A
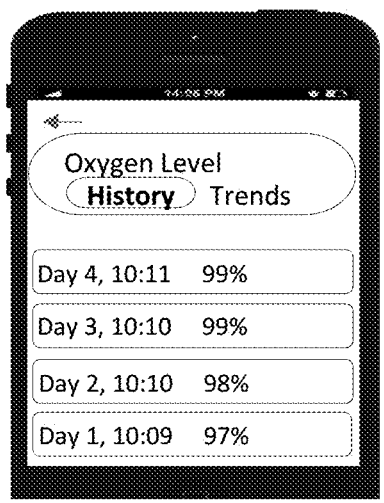
Fig. 14B
Fig. 14C

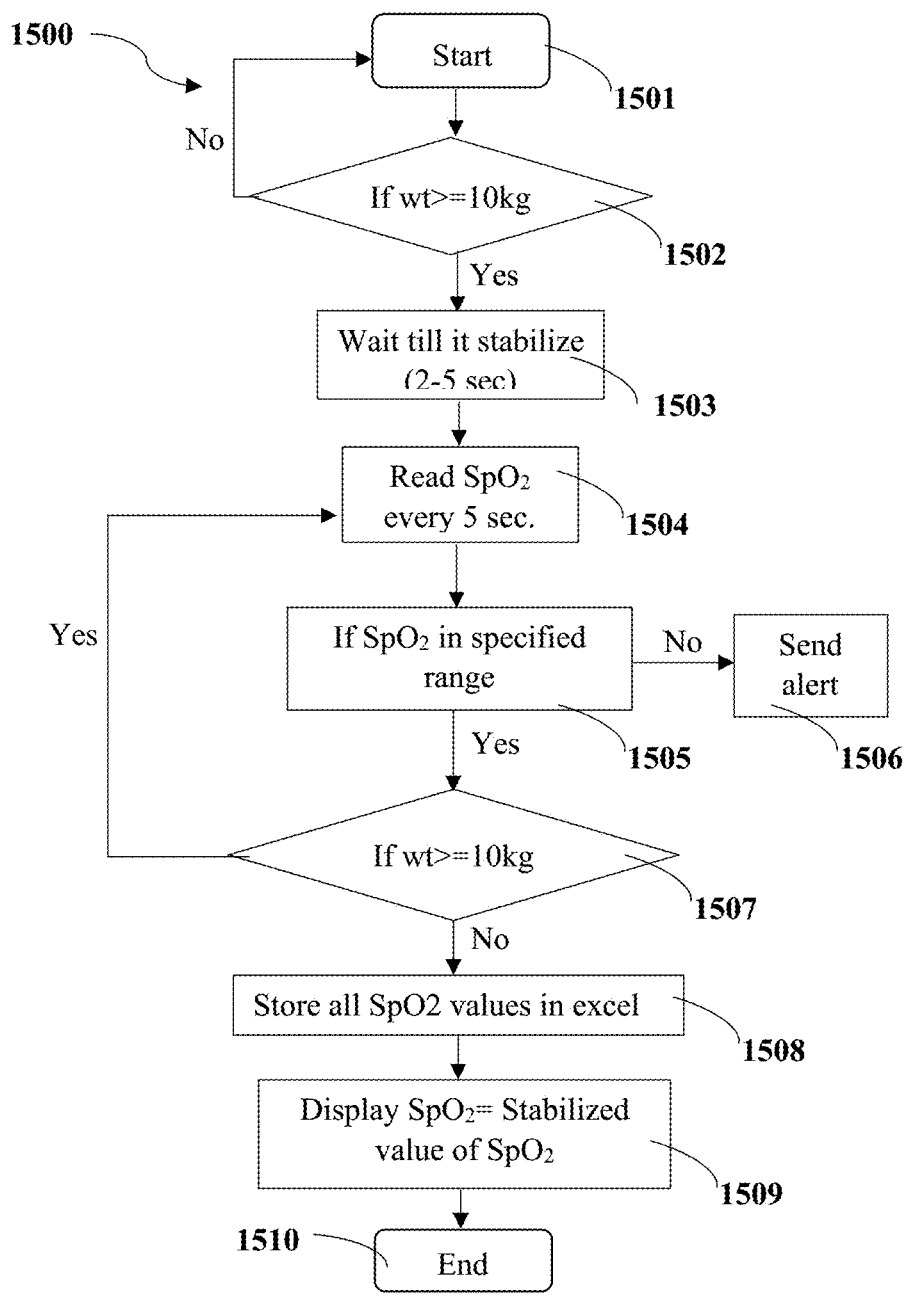
Fig. 15 SpO₂ Flowchart

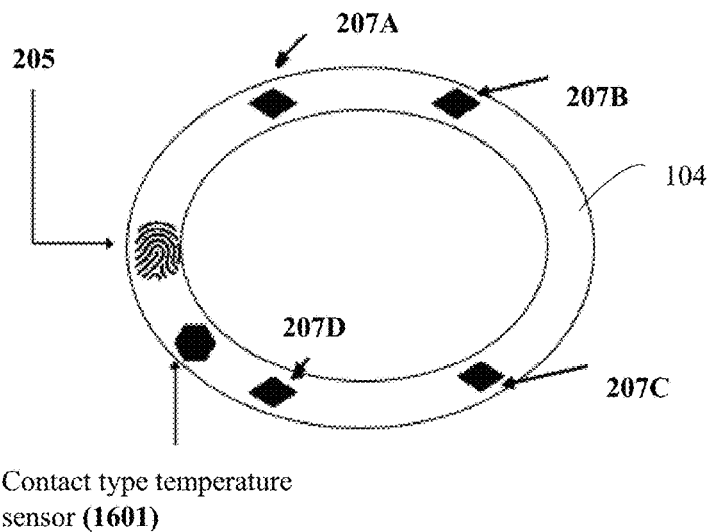
Fig. 16A Fingerprint sensor and ECG
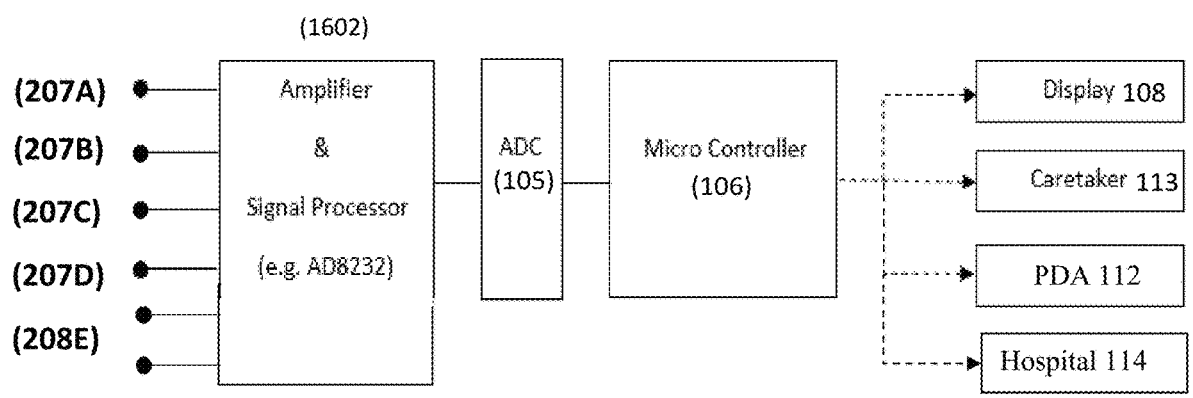
Fig. 16B ECG electrodes circuitry

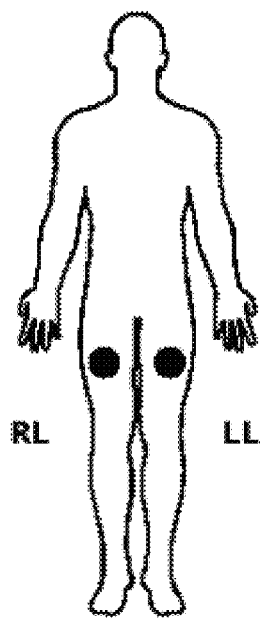
Fig. 16C
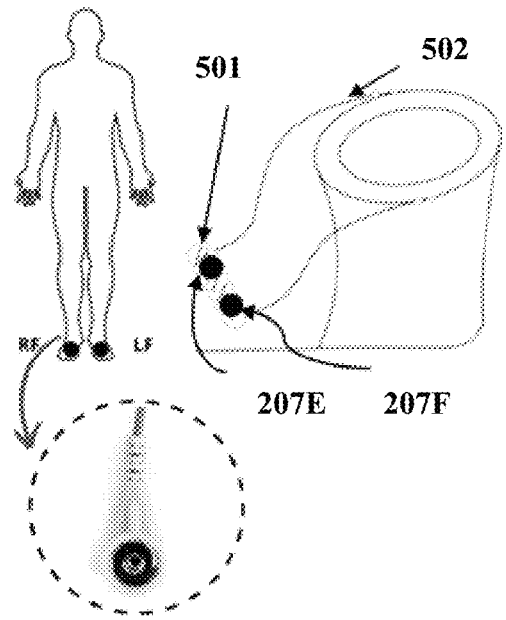
Fig. 16D
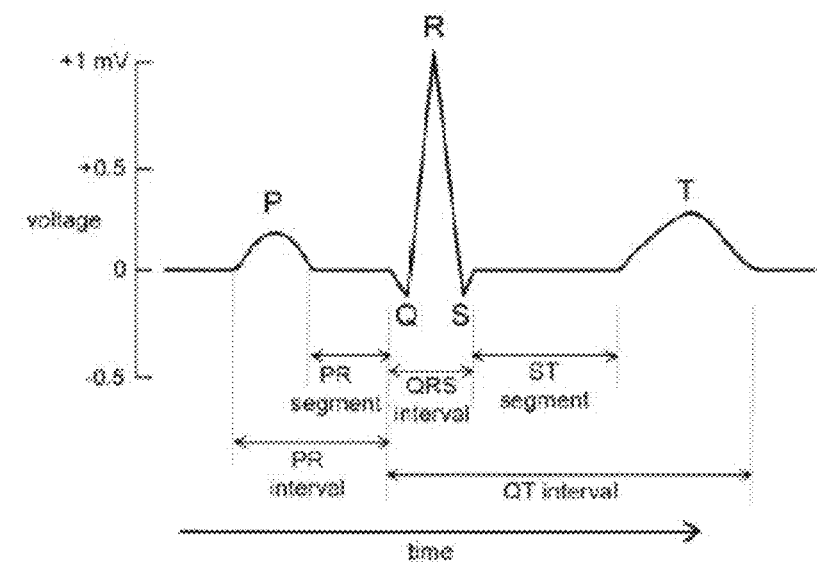
Fig. 16E PQRST

LAVATORY EQUIPMENT

CROSS-REFERENCE TO RELATED APPLICATIONS

This application is a U.S national stage of International Application No. PCT/IB2021/061677 filed on Dec. 14, 2021. The disclosure of the above-referenced application is hereby incorporated by reference in its entirety.

FIELD OF INVENTION

The present invention relates to a medical equipment for health assessment of an individual. More particularly, the present invention relates to a lavatory equipment configured to assess and diagnosis the vital parameters of a human body.

BACKGROUND OF INVENTION

The overall health of the human subject is primarily assessed with the help of vital parameters such as body temperature, pulse rate, respiration rate, blood oxygen saturation, and physical parameters such as weight.

In traditional residential care facilities, these indices are measured and observed by caregivers. The measurements of vital parameters are generally done by individual equipment and charted by the caregivers. The continuous assessment of such data is mainly important for geriatric, cognitive care-based institutions of vulnerable population.

A number of diagnostic equipment are available in the market which carry out measurement of vital human parameters and communicate the same to the user via an interface. Such instruments need to be purchased by the user or a care giver independently for the assessment of various health parameters. Such health checkup instruments work with different electrical connection jacks and receptacles having different voltage and power requirement. Also, the existing diagnostic equipment do not have a facility to store an assessment data to a single data source.

A person undergoes variation in vital parameters while passing faeces/urine. The variation detection can help early diagnose diseases such as Cardiac arrest. Measuring parameters of individuals by doctor or paramedical staff is difficult as toilet is a private area. As per NCBI USA research, 11% of Cardiac arrests (hereinafter may be referred to as 'CA') happen in toilet. The part of the research report suggests that, in 63 (62%) events, the concern of family members that a patient had stayed in the toilet "too long" led to their visit to the toilet and subsequent discovery that the individual had sustained CA. In 22 (22%) events, a loud sound/noise due to the patient's collapse onto the floor of the toilet prompted family members to investigate. In ten (10%) events, the CA occurred in the presence of caregivers as the patient had been dependent on the help of caregivers and required assistance in the toilet. The only long-term survivor belonged to this subgroup. The remaining six patients (6%) called or cried for help and were found on the floor by family members who rushed to the toilet. The rates of ROSC in these four subgroups were 30, 55, 70, and 57%, respectively. There were no significant intergroup differences in the frequency of ROSC. In none of the 101 patients was alarm call system available or deployed. (*Cardiac arrest in the toilet: clinical characteristics and resuscitation profiles*, Inamasu et. al. *Environ Health Prev Med.* 2013 March; 18 (2): 130-13)

A monitoring and analysis of one or more vital parameters should help in analyzing body response of user while in toilet. Eventually, such an analysis will help diagnose diseases such as constipation, as data for daily pattern of vital parameters stay time, frequency of visits will be available for analysis. The advantages of quick diagnosis of the vitals will also help early detection of cardiac arrest as an abnormal ECG will be immediately conveyed to caregiver/doctor. Therefore, a system should be enabled to enhance safety of the user as early detection of user either through emergency alarm switch or other parameters measurement will reduce time to avail medical help.

Hence, there is a long-standing need of to develop an equipment which is capable of carrying out early detection of variation in vital parameters simultaneously without requiring the user to spend excess time and energy for carrying out the tests by means of separate equipment or by visiting labs. There is also a requirement to develop an equipment which is easy to operate by a human subject without any help from a caregiver.

In view of the above, the present invention introduces a lavatory equipment enabled for early detection of abnormality such as cardiac arrest, quick response, simultaneous assessment and diagnosis of a plurality of vital parameters of human body, and capable to adapt to obviate the problems/drawbacks of the existing health monitoring equipment in the state of the art.

OBJECTIVES OF THE INVENTION

The main objective of the present invention is to develop a lavatory equipment, which is enabled for simultaneous measurement, recording, assessment and diagnosis of a plurality of vital parameters of human body in an easy to operate, economical, user-friendly, efficient power consumption enabled and commercially viable manner.

SUMMARY OF THE INVENTION

Before the present, system, method, and products are described in the said proposed invention, it is to be understood that the disclosed invention is not limited to the specific system, methods, and products as described herein, as there can be multiple possible embodiments which are not expressly illustrated in the present invention but may still be practicable within the scope of the invention. It is to be understood that the terminology used in the description is to describe the particular versions or embodiments only and is not intended to limit the scope of the present application.

The present invention describes a lavatory equipment enabled for simultaneous assessment and diagnosis of a plurality of vital parameters of human body, the said lavatory equipment is operation friendly and may act as a health assistant to a user.

According to an embodiment of the present invention, the lavatory equipment is enabled for simultaneous assessment and diagnosis of a plurality of vital parameters of human body. The lavatory equipment may comprise a toilet seat installed with a plurality of sensors to measure and assess the plurality of vital parameters of human body. The said lavatory equipment may further comprise a seat ring mounted over a toilet seat. The seat ring may be further attached to a rotatable axis rod enabling swing from a horizontal position to vertical position. The said lavatory equipment may further comprise a microcontroller unit configured to store and process data received from the plurality of sensors, said data comprising the plurality of vital parameters of human body. The microcontroller unit may further be configured to compare the plurality of vital parameters with pre-standard parameters. The said lavatory equipment may further comprise a display unit configured to display the measured vital parameters values and provide voice enabled interactive information to a user. The said lavatory equipment may further comprise a power supply adapter unit configured for receiving domestic A.C power supply along with a small battery unit enabling power backup for a predefined time. The said plurality of sensors may comprise a weight sensor comprising a plurality of load cells positioned symmetrically on a seat ring to bear total weight of a human body. The weight sensor may be further connected to a multi-pin connector which affixed to the microcontroller unit via a plurality of leads. The said weight sensor may be configured to record and analyze total discharge of the user. The said lavatory equipment may further comprise a temperature sensor comprising an IR sensor. The said temperature sensor is affixed to the microcontroller unit above a water jet at a predefined height. The said lavatory equipment may further comprise a pulse oximeter unit connected to the microcontroller unit by at least one registered jack unit male and a female connector. The said pulse oximeter unit may be positioned in such way that, it enables measurement of pulse from either side of the seat with help of a swing string. The said lavatory equipment may comprise an ECG electrode unit positioned on the seat ring, wherein the ECG electrode unit comprises ECG electrodes positioned on a footrest. The said lavatory equipment may further comprise a finger-print sensor. The said lavatory equipment may further comprise a blood glucose sensor. The said lavatory equipment may further comprise a blood pressure sensor. The said lavatory equipment may further comprise an electromechanical switch. The said lavatory equipment may further comprise an emergency push switch attached to the microcontroller unit at a predefined height.

In one embodiment, the microcontroller unit may be communicatively coupled with a user device (e.g., a caregiver device) via a central server. The caregiver device may be configured for receiving a health condition data of the user. In one embodiment, the caregiver device may access a mobile and/or web application, stored on the central server, enabled for displaying the health condition data of the user.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer to features and components.

FIG. 4A depicts a top view of plurality of load cells of a weight sensor unit (202) connected to the microcontroller unit (106) via a plurality of leads (407), in accordance with an embodiment of the present invention.

FIG. 4B depicts a side view of plurality of load cells of a weight sensor unit (202) connected to the microcontroller unit (106) via a plurality of leads (407), in accordance with an embodiment of the present invention.

FIG. 6A-6C depict a weight v/s time graph based on working of the weight sensor (202), and the corresponding display of weight measurement of one or more users on a display device, in accordance with an embodiment of the present invention.

FIG. 7 illustrates a flowchart depicting steps followed by the microcontroller (106) to record, store, and analyse the weight parameters of the user, in accordance with an embodiment of the present invention.

FIGS. 8A and 8B depicts positioning of an emergency alarm switch (802) and an electromechanical switch (805) on the lavatory equipment (100), in accordance with an embodiment of the present invention.

FIG. 9A-9C depict a temperature v/s time graph based on working of the temperature sensor (203), and the corresponding display of temperature measured for one or more users on a display device, in accordance with an embodiment of the present invention.

FIG. 10 illustrates a flowchart depicting steps followed by the microcontroller (106) to record, store, and analyse the temperature parameters of the user, in accordance with an embodiment of the present invention.

FIG. 13 illustrates a flowchart depicting steps followed by the microcontroller (106) to record, store, and analyse the pulse parameters of the user, in accordance with an embodiment of the present invention.

FIG. 14A-14C depict a $SpO_2$ level v/s time graph based on working of the Pulse Oximeter (204), and the corresponding display of SpO2 measured for one or more users on a display device, in accordance with an embodiment of the present invention.

FIG. 15 illustrates a flowchart depicting steps followed by the microcontroller (106) to record, store, and analyse the SpO2 of the user, in accordance with an embodiment of the present invention.

FIG. 16A depicts a positioning of fingerprint sensor and ECG electrodes on a toilet seat ring (104), in accordance with an embodiment of the present invention.

FIG. 16B depicts a connection of one or more ECG electrodes with amplifier, microcontroller, and display units, in accordance with an embodiment of the present invention.

FIG. 16C-16D depicts a contact of one or more ECG electrodes to the user body, in accordance with an embodiment of the present invention.

FIG. 16 E depicts a graphical representation of the intermittent measurement by ECG electrodes, in accordance with an embodiment of the present invention.

DETAILED DESCRIPTION OF THE INVENTION

The words "comprising", "having", "containing", "including" and other forms thereof, are intended to be equivalent in meaning and be open-ended in that an item or items following any one of these words is not meant to be an exhaustive listing of such item or items or meant to be limited to only the listed item or items.

It must be noted that the singular forms "a", "an", and "the" include plural references unless the context clearly dictated otherwise, although any methods similar or equivalent to those described herein can be used in the practice or testing of embodiments of the present invention, the exemplary methods are described. The disclosed embodiments are merely exemplary of the invention, which may be embodied in various forms.

Various modifications to the embodiment may be readily apparent to those skilled in the art and the generic principles herein may be applied to other embodiments. However, one of ordinary skill in the art may readily recognize that the present invention is not intended to be limited to the embodiments illustrated but is to be accorded the widest scope consistent with the principles and features described herein.

No terminology in this application should be construed as indicating any non-claimed element as essential or critical. The use of any and all examples, or exemplary language (e.g., "such as") provided herein, is intended merely to better illuminate example embodiments and does not pose a limitation on the scope of the claims appended hereto unless otherwise claimed.

Recitation of ranges of values herein is merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range.

The present invention now will be described in total hereinafter. Indeed, the invention may be embodied in many different forms and should not be construed as limited to the embodiments set forth herein; rather, these embodiments are provided so that this invention will satisfy applicable legal requirements.

The present invention discloses a lavatory equipment enabled for simultaneous assessment and diagnosis of a plurality of vital parameters of human body, the said lavatory equipment is operation friendly and may act as a health assistant to a user.

Figure 1:
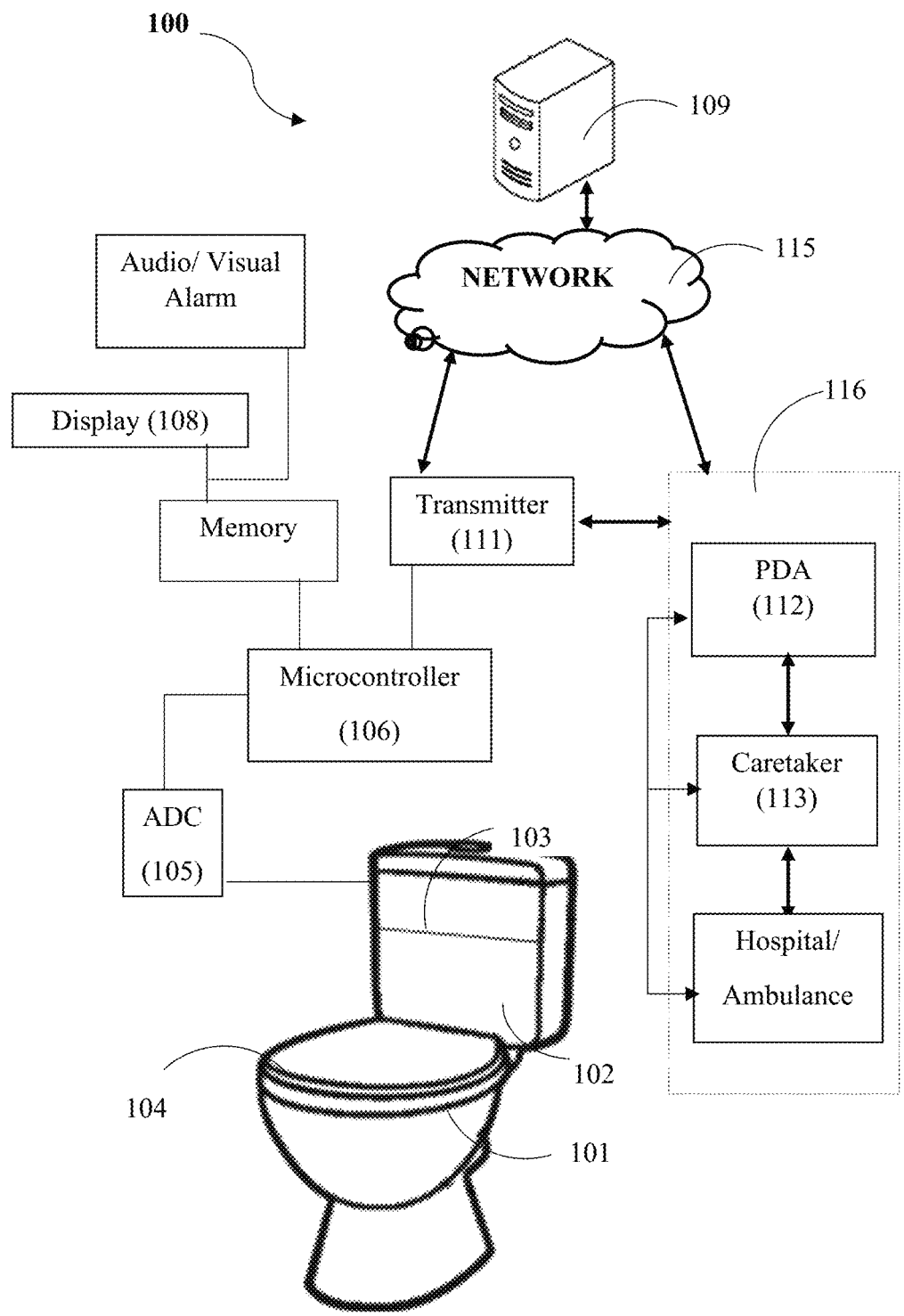
FIG. 1 depicts a lavatory equipment (100) comprising one or more components, in accordance with an embodiment of the present invention.

In one embodiment, referring to FIG. 1, the present invention discloses a lavatory equipment (100) enabled for simultaneous assessment and diagnosis of a plurality of vital parameters of human body.

Figure 2:
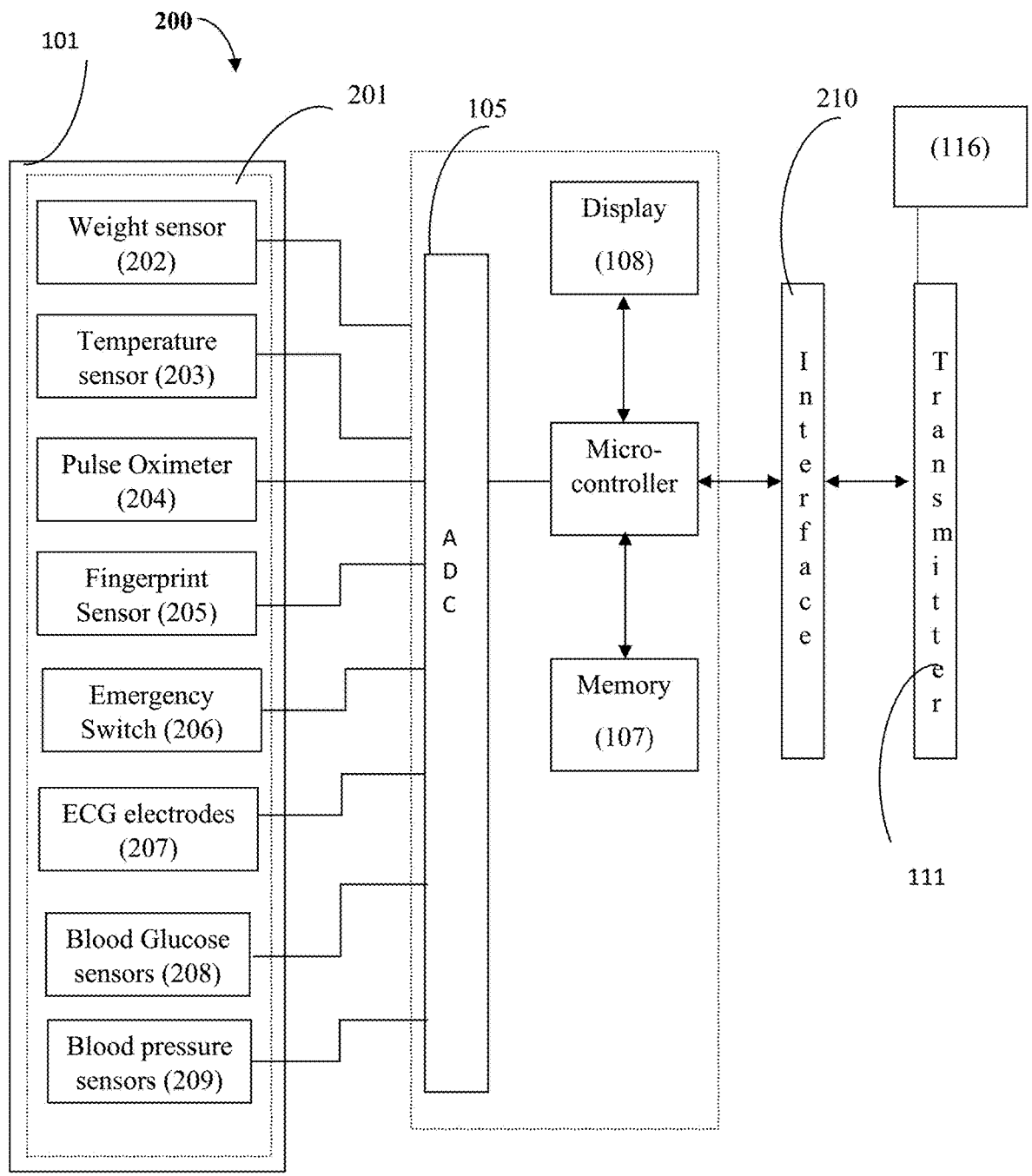
FIG. 2 depicts a schematic positioning of a plurality of sensors (201) w.r.t to other components, in accordance with an embodiment of the present invention.

Referring to FIG. 1-3, the said lavatory equipment (100) may comprise a toilet seat (101) installed with a plurality of sensors (201) to measure and assess the plurality of vital parameters of human body. The said lavatory equipment (100) may also be configured to record and assess an abnormality in a health condition of the user and send an emergency notification to a user device (116), hereinafter referred to as a caregiver device (116). In one embodiment, the caregiver device 116 may belong to any one of but not limited to a nursing service, a caretaker, attendant, relative, physician, diagnostic center, or personal digital assistance, and a hospital.

In one embodiment, as illustrated in FIG. 1, the caregiver device (116) may be any device configured for communicating with the microcontroller device (106) via a central server (109) through a network (115). In an embodiment, the microcontroller unit (106) may be optionally installed in a toilet seat unit (101) as a microcontroller (103) positioned above a water storage unit (102). In another embodiment, the microcontroller unit (106) may directly communicate with the caregiver device (116) via a transmitter (111).

In one embodiment, the toilet seat (101) may be connected to the caregiver device (116) through the network (115). It will be understood that the toilet seat (101) may be implemented in a lavatory equipment (100).

In one embodiment, as illustrated in FIGS. 1 and 2, the microcontroller (100) may access wired/wireless network (115) to send an information of user to the caregiver device (116). In an embodiment, the microcontroller unit (106) can communicate with the caregiver device (116) through the central server (109). It may be understood that the microcontroller unit (106) may be communicatively coupled with the caregiver device (106) through a variety of devices such as a but are not limited to, personal digital assistance (PDA), a caretaker mobile, a display device of hospital/ambulance, a portable computer, a personal digital assistant, a handheld device, a mobile, a laptop computer, a desktop computer, a notebook, a workstation, a mainframe computer, and the like.

In one implementation, the network (115) may be a wireless network, a wired network or a combination thereof. The network can be accessed by the user device using wired or wireless network connectivity means including updated communications technology.

In an embodiment, the caregiver device (116) may access a mobile and/or web application, stored on the central server 109, which is enabled for displaying health condition data of the user. The health condition data may comprise but not limited to vital parameter details of a user such as weight, temperature, pulse, oxygen level, SpO$_2$ level, fingerprint recognition, user details, emergency alert, blood glucose level, blood pressure, ECG readings, and the like. The said mobile/web application may be communicatively coupled with the microcontroller unit (106) and the central server (109) for transfer and analysis of the health condition data of the user. In one embodiment the caregiver device may be configured to work as a monitoring unit.

Referring to FIG. 4A-4B, the said plurality of sensors (201) may comprise a weight sensor unit (202) comprising a plurality of load cells (401, 402, 403, . . . , 406) ranging from 4 to 8, and positioned symmetrically on a seat ring (104) to bear total weight of a human body, and is connected to an eight-pin female connector (407) which is affixed to the microcontroller unit (106) via a plurality of leads. The plurality of leads may be between 4 to 8. The said plurality of leads may be a 4-6 load cell (LC) connector. In one embodiment, for 4 load cells 8 leads may be added to the eight-pin connector (407). In one embodiment, the plurality of load cells may be 4-8 (401, 402, 403, . . . , 406) which may contain 6 load cells and 2 leads added to a 12-pin female connector.

In one embodiment, the weight sensor unit (202) is connected to the microcontroller (106). The said lavatory equipment (100) is configured to display weight variation parameters on a digital display device such as mobile, and laptop etc. The weight sensor unit (202) may also be configured for sending out indication to a device of a caretaker, a physician, and laboratory for further analysis.

Referring to FIGS. 1-2, 4, and 17, the lavatory equipment is configured to carry out a signal processing and data recording of the total weight output from the weight sensors (401-406) through analog to digital converter (ADC) (105) for conversion of a recorded weight measurement data into a digital form. The microcontroller (106) receives, stores, and processes weight data.

In one embodiment of the present invention, the weight sensor unit (202) positioned over a toilet seat ring (104) and integrated with the microcontroller unit (106) may be configured to measure a variation in weight of the user before and after defecation and thereby enabling measurement of total discharge of the user. A regular decrease or increase in weight & body discharge is taken as alert and informed to the user through a lavatory equipment (100) as it may be a symptom of any diseases.

Figure 17:
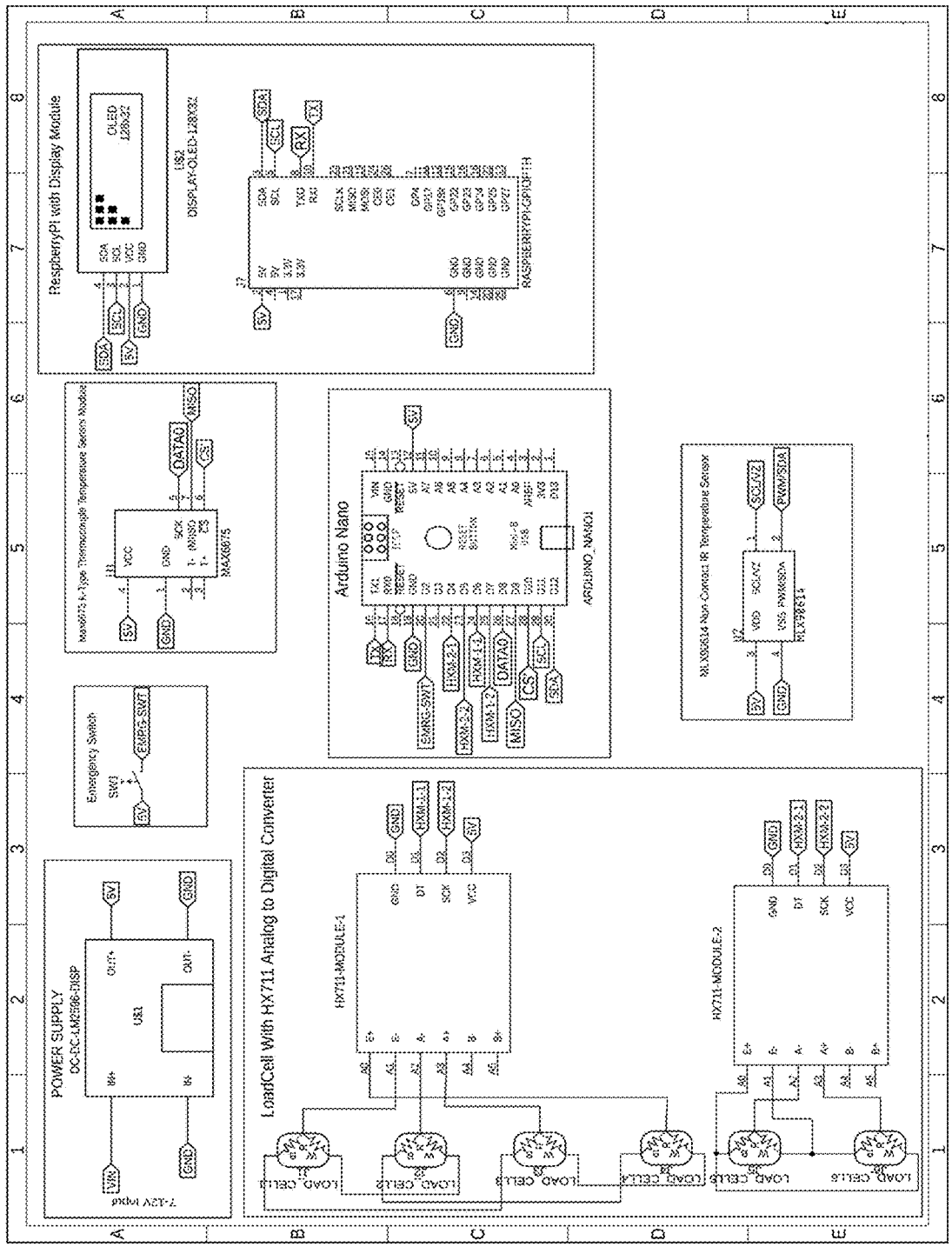
FIG. 17 depicts a circuit diagram of an electronic circuitry arrangement on a toilet seat ring (104) for weight measurement through a weight sensor unit (202), a temperature sensing, an emergency switch operation, a fingerprint sensor, an ECG measurement, blood glucose measurement, blood pressure measurement, in accordance with an embodiment of the present invention.

In one embodiment, referring to FIG. 4A-4B, the one or more weight sensor leads 401-406 are connected such that total weight is sum of all weight sensor outputs. In another scenario, the total weight of user can be calculated as proportional to the sum of all weight sensor outputs. Referring to FIG. 17 a practical circuit arrangement of 6 load cells (i.e., 401-406) is depicted in schematic circuit diagram.

In one embodiment, as illustrated in FIG. 5A-5D, a mechanism of measurement and analysis of a weight of the user while seating on a toilet seat (104) of the lavatory equipment (100) is depicted, in accordance with an embodiment of the present invention.

In one embodiment, as illustrated in FIG. 1-2, 4A-4B, and 5A-5D, and 17-18, the weight sensor unit (202) positioned over a toilet seat (101) is communicatively coupled with the microcontroller unit (106). The said weight sensor unit (202) may be configured to determine a total body discharge and a user body weight by carrying out a process (1800) by performing one or more steps.

Figure 18:
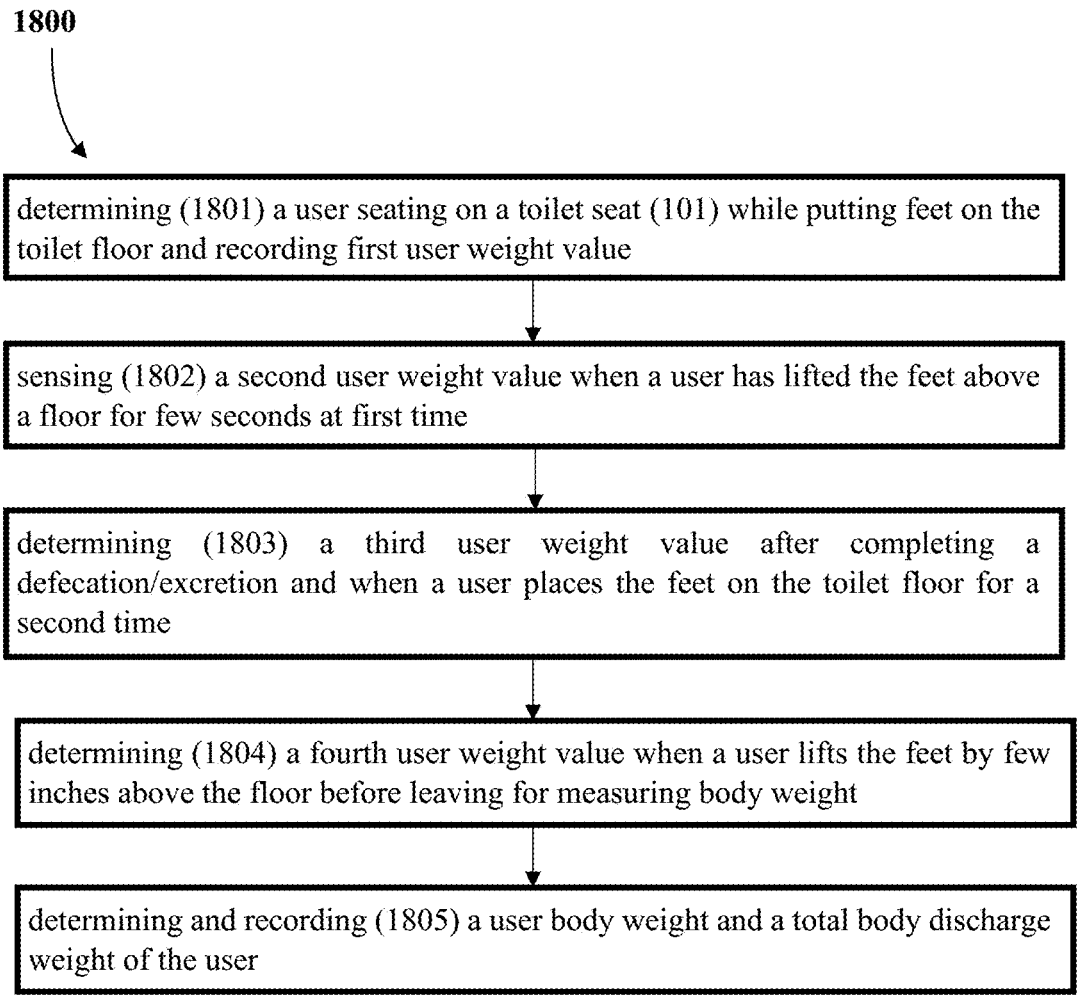
FIG. 18 depicts process steps (1800) for simultaneous determination of a user body weight and a total body discharge weight of the user via a weight sensor unit (202), in accordance with an embodiment of the present invention.

In one embodiment, as illustrated in FIG. 18, the process (1800) may comprise a step of determining (1801) a user seating on a toilet seat (101) while putting feet on the toilet floor and recording first user weight value. The process (1800) may comprise a step of sensing (1802) a second user weight value when a user has lifted the feet above a floor for few seconds at first time. The process (1800) may comprise a step of determining (1803) a third user weight value after completing a defecation/excretion and when a user places the feet on the toilet floor for a second time. The process (1800) may comprise a step of determining (1804) a fourth user weight value when a user lifts the feet by few inches above the floor before leaving for measuring body weight. The process (1800) may further comprise a step of determining and recording (1805) the user body weight and the total body discharge weight of the user.

In another embodiment, the weight sensor unit (202) positioned over a toilet seat ring (104) and integrated with the microcontroller unit (106) is configured to measure a stay time by measuring weight after a fixed time interval.

Figure 3A:
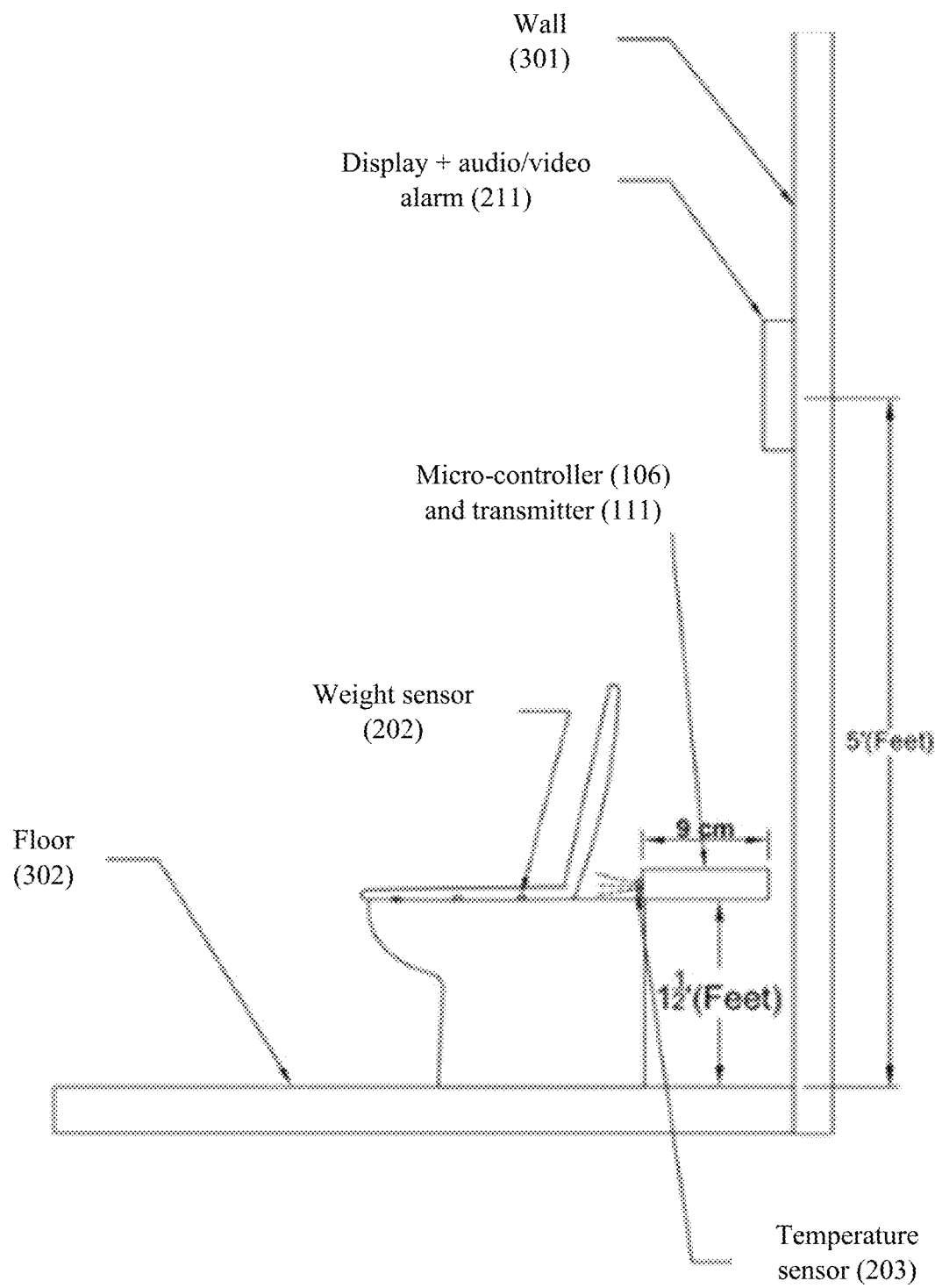
FIGS. 3A and 3B depict a fitment and display arrangement of one or more components of the lavatory equipment (100), in accordance with an embodiment of the present invention.
Figure 3B:
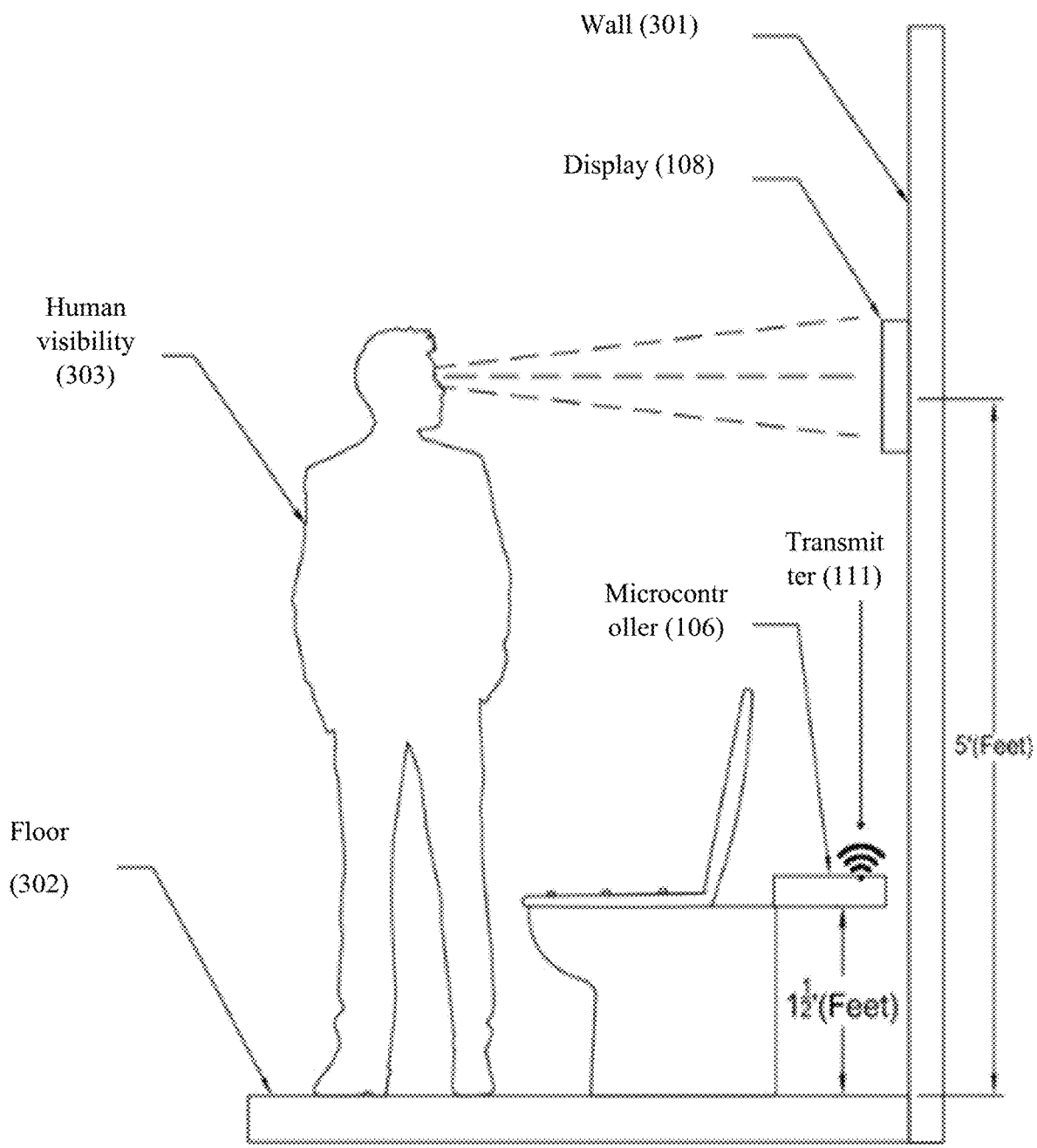

In yet another embodiment, referring to FIG. 1-3, one or more values calculated by the weight sensor unit (202) are displayed on the display unit (108) positioned at a pre-defined distance from the floor. The display panel of the display unit (108) is at user eye level when the user is in standing as shown in FIG. 3B.

In still another embodiment, as illustrated in FIG. 7, a process flow chart (700) for weight measurement is disclosed. At block (701), weight measurement via one or more weight sensors (401-406) is initiated. At block (702), if weight is determined to be greater than 10 kgs, then the microcontroller (106) is configured to read weight every five seconds at block (703). At block (702) if the weight is not determined to be greater than 10 kg then the process returns to block (701). At block (704) if after every 5 second interval the weight is determined to be greater than 10 kg and the time is exceeded beyond 40 mins as per block (705), then at block (706), the microcontroller unit (106) is configured to send an alert to the caregiver device (116). In an embodiment, if at block (704) the weight is read less than 10 kg then weight v/s time graph is plotted as per block (707). At block (708), highest maxima weight value (Maxima 1) and second highest maxima weight value (Maxima 2) is calculated. At block (709), a body weight of the user is calculated and displayed as Maxima 1 and the total body discharge weight is calculated and displayed as difference of Maxima 1 and Maxima 2. At block (710) the process of weight measurement ends by recoding the user body weight as well as total body discharge weight.

Referring to FIGS. 2 and 8B, in one embodiment of the present invention, the said lavatory equipment (100) may comprise an IR temperature sensor (203) which is affixed to the microcontroller unit (106) above a water jet (807) at an exemplary predefined height of 1-2 feet and preferably 2-8 inches from the ring (104).

In one embodiment, the said microcontroller unit (106) may be optionally positioned above a water storage unit (102) unit as microcontroller (103) of the medical equipment (100). The IR temperature sensor (203) is fixed to the microcontroller unit (106 in FIG. 2), through ADC (105), above toilet water jet at a predefined height. The IR temperature sensor (203) is placed at a fixed position as shown in FIG. 2B.

In an example, the arrangement of the IR temperature sensor (203) is such that the temperature sensor may measure the temperature values of the user while he is sitting on the toilet seat. A final temperature of the user is calculated as the maximum temperature of all the temperature sensor readings.

Referring to FIG. 1 and FIG. 10, a temperature output from temperature sensor (203) is given to ADC (105) for conversion to digital form. The microcontroller (106) receives, stores, and processes temperature data.

In another embodiment, the temperature measurement sensor unit (203) is an infrared temperature sensor which is a contact less sensor. The user does not have to opt for any special methods to measure the temperature. When the person sits on the toilet seat (101), the temperature sensor (203) in FIG. 2 affixed at the back of the toilet seat as depicted in FIG. 8B measures the body temperature of the user impinging infrared rays on the body of the user.

Referring to FIG. 16A, in one embodiment of the present invention, a contact type temperature sensor (1601) is placed on the toilet seat ring (104) to measure skin temperature of the thighs of the user.

In one embodiment, the lavatory equipment comprises both type of temperature sensors. The user can select either of the two temperature sensors i.e., contact type (1601) or contactless IR temperature sensor (203) for display on the display (108) or mobile Application of the User/caretakers.

In still another embodiment, as illustrated in FIG. 10, a process flow chart (1000) for Temperature measurement and analysis flowchart is disclosed. The flowchart 1000 begins with block (1001) wherein weight measurement via one or more weight sensors (401-406) is initiated. At block (1002), if weight is determined to be greater than 10 kg then the process is directed to block (1003) to wait until the weight reading is stabilized for 2-5 seconds. In an embodiment, if the weight is determined to be less than 10 kg then the process returns to block (1001). At block (1004), once the weight reading is stabilized, a user temperature is measured and recorded by means of temperature sensor (203). At block (1005), if the temperature is in specified range, then the process is directed to the block (1007) to check whether the weight is still greater than 10 kg. The determination of the weight greater than 10 kg is considered as an indicator that the user is using the lavatory equipment (100) and in such condition, the process proceeds to block (1104) to continue measuring and recording the temperature. At block (1005) if the temperature reading is not within the specified range, then an alert may be sent to the caregiver device (116) as per block (1006). In an embodiment, if at block (1007) the weight is determined to be less than 10 kg, then temperature v/s time graph is plotted as per block (1008). At block (1009), maximum temperature value and average temperature value is calculated and displayed. At block (1010) the process of temperature measurement ends by recoding the user body temperature.

In another embodiment of the present invention, the lavatory equipment (100) as described in the present invention comprises of an integrated pulse-$SpO_2$ sensor (204) which is used for measuring pulse and oxygen saturation level $SpO_2$ of user.

Figure 11A:
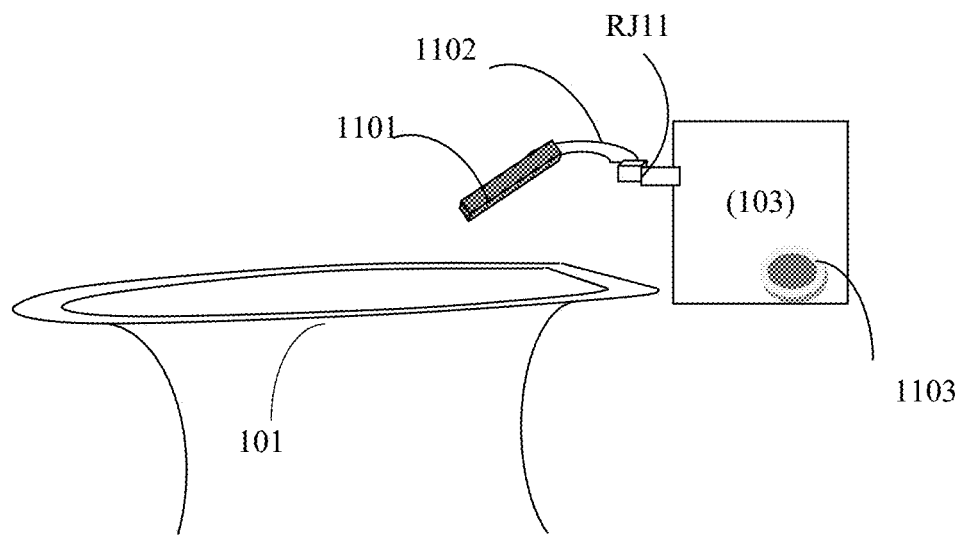
FIGS. 11A and 11B depicts a positioning of a fingerprint sensor (205) and a Pulse Oximeter (204) affixed to a registered jack of the microcontroller unit (106) or to a registered jack of swing string (1104) connected to the microcontroller unit (106), in accordance with an embodiment of the present invention.
Figure 11B:
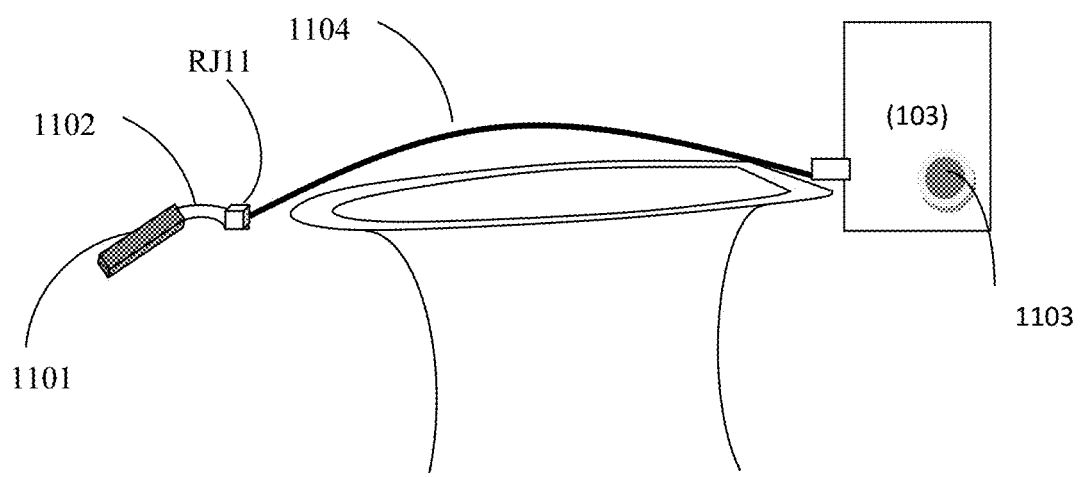

Referring to FIGS. 11A and 11B, the pulse oximeter unit is connected to the microcontroller unit (106) and is positioned in such a way that is enables measurement of pulse from either side of seat with help of a string swing (1104) as shown in FIG. 11B. The arrangement of string swing (1104) is such that the pulse oximeter is configured to measure the pulse values of the user while the user is sitting on the toilet seat. The connection leads from these RJ connectors are connected to microcontroller (106) through ADC (105).

In another embodiment, the lavatory equipment (100) as described in the present invention comprises of a component configured for measuring $SpO_2$ in a lavatory equipment (100). The pulse oximeter unit is configured for measuring $SpO_2$, analyzing and displaying the $SpO_2$ value on screen analysis of pulse variation parameter on the display device and alerts to the caretaker.

In yet another embodiment, the lavatory equipment (100) may comprise an ECG unit (207) having a plurality of ECG electrodes. The lavatory equipment (100) is configured for plotting and analyzing ECG through an ECG arrangement, display the analysis of ECG and pulse variation parameter on the display unit (108) or to a mobile Application of caretaker/user. In still another embodiment, the lavatory equipment may be configured to read and determine an abnormal ECG and can be used to send an alert on display unit or the mobile Application of the caretaker/user on the caregiver device (116).

In one embodiment, the toilet seat ring (104) of the lavatory equipment (100) is configured to measure an ECG of the user through seat ring mounted ECG electrodes 207A, 207B, 207C, 207D as depicted in FIG. 16A. The ECG electrodes 207A, 207B, 207C, 207D are configured to pick electrical signal from thighs of the user as thighs are in contact with the electrodes.

In a scenario, wherein the electrical signals received from thighs are weak, an amplifier unit with noise reduction capabilities is enabled to amplify and process the signals. The microcontroller unit (106) is configured to analyze the signals to determine Heart rate, irregularities in ECG when compared to normal ECG of the user. The microcontroller unit (106) may also be configured to inform the user device/caretaker about the abnormal heart rate and ECG irregularities, if any.

In one embodiment, four ECG electrodes are placed on the toilet seat ring as shown in FIG. 16A and two ECG electrodes are on support stand footrest (501) as shown in FIGS. 16C and 16D.

In one embodiment, the positioning of a plurality of ECG electrodes 207A, 207B, 207C, 207D of FIG. 16A, and electrodes 207E, 207F as shown in FIG. 16D enabled low resistance contact with human body through thighs touching the toilet seat ring and feet touching the foot rest of support stand. The number of electrodes may be optimizable from 3 to 8 based on the sensitivity and accuracy requirements. In one embodiment, a symmetrical positioning of 4 electrodes is depicted in FIG. 16A, and the other two electrodes are positioned over the footrest (501) as depicted in FIG. 16D.

In one example, the microcontroller unit (106) may be configured to provide the Amplifier output to analog to digital convertor (ADC) which may be further transferred to the microcontroller (106) for analysis, and storage of ECG reading of the user. The microcontroller is configured to send this ECG analytics to the caretaker through the display unit (108) and the mobile application. The bioelectrical signal from thighs is given to amplifier and further to analog to digital convertor (ADC) for conversion to digital form. The microcontroller receives, stores, and processes data to determine the ECG of the user.

In still another embodiment, as illustrated in FIG. 13, a process flow chart (1300) for user pulse measurement and analysis flowchart is disclosed. The flowchart 1300 begins with block (1301) wherein weight measurement via one or more weight sensors (401-406) is initiated. At block (1302), if weight is determined to be greater than 10 kg as per then the process is directed to wait till the stabilization of reading within 2-5 seconds at block (1303). In an embodiment, if the weight is less than 10 kg then the process returns to block (1301) and is executed further only when the weight greater than 10 kgs is observed. At block (1304), once the weight reading is stabilized, a user pulse is measured and recorded by means of pulse oximeter unit (204). At block (1305), if the pulse reading is in specified range, then the process is directed to the block (1307) to check whether the weight is still greater than 10 kg. The determination of weight greater than 10 kg is considered as an indicator that the user is using the lavatory equipment (100). At block (1305) if the pulse reading is not within the specified range, then an alert may be sent to the caregiver device (116) as per block (1306). In an embodiment, if at block (1307) the weight is determined to be less than 10 kg then pulse reading values are stored in memory (107) as per block (1308). At block (1309) a stabilized pulse value is calculated and displayed. At block (1310) the process of pulse measurement ends by recoding the user pulse value at the time of lavatory use.

In yet another embodiment, the lavatory equipment (100) as described in the present invention comprises of a blood glucose sensor (208). In another embodiment, the blood glucose sensor is a non-invasive sensor positioned on a toilet seat ring (104). In one embodiment, the blood pressure is also measured by placing blood pressure sensor on toilet seat ring (101). A positioning of the blood pressure sensor is same as that of placing contact type sensor (1601) as disclosed in FIG. 16A. An output of the blood pressure sensor is fed to analog to digital convertor which is further fed to microcontroller (106), display, and alerts, etc. follow same procedures as explained for the temperature, weight measurement process.

In still another embodiment, the toilet seat ring (104) may comprise a bioactive integrated sensor as a single sensor to measure three vitals of human body i.e. blood pressure, heart rate and $SpO_2$ (oxygen level). The said integrated sensor is configured to measure a plurality of parameters of user sitting on the lavatory equipment. The positioning of the integrated bioactive sensor is same as that of the contact type temperature sensor (1601). The bioactive sensor is a single chip integrated sensor to measure three vitals of human body i.e., blood pressure, heart rate, and $SpO_2$ (oxygen level).

In still another embodiment, as illustrated in FIG. 15, a process flow chart (1500) for user Oxygen saturation ($SpO_2$) measurement and analysis flowchart is disclosed. The flowchart 1500 begins with block (1501) wherein weight measurement via one or more weight sensors (401-406) is initiated. At block (1502), if weight is determined to be greater than 10 kg as per block (1502) then the process waits till the stabilization of reading within 2-5 seconds at block (1503). In an embodiment, if the weight is determined to be less than 10 kg then the process returns to block (1501) and is only executed further when the weight is determined to be greater than 10 kgs. At block (1504) once the weight reading is stabilized, a $SpO_2$ value is measured with every 5 seconds of an interval and recorded by means of pulse oximeter unit (204). At block (1505) if the $SpO_2$ reading is in specified range, then the process is directed to the block (1507) to check whether the weight is still greater than 10 kg. The determination of weight greater than 10 kg is considered as an indicator that the user is using the lavatory equipment (100). At block (1505), if the $SpO_2$ reading is not within the specified range, then an alert may be sent to the caregiver device (116) as per block (1506). In an embodiment, if at block (1507) the weight is determined to be less than 10 kg then $SpO_2$ reading values are stored in memory (107) as per block (1508). At block (1509) a stabilized $SpO_2$ value is calculated and displayed. At block (1510) the process of $SpO_2$ measurement ends by recoding the user pulse value at the time of lavatory use.

In one embodiment, referring to FIGS. 8A and 8B, the lavatory equipment may comprise a small electromechanical push switch (805). The said electromechanical push switch (805) may be integrated with the weight sensor unit (202) and a proximity sensor (806). The electromechanical push switch (805) is placed on the toilet ring in such a way that as the user sits on the toilet seat, the switch is pressed, and the switch is "ON". As the user leaves the toilet seat, weight is off from the toilet ring, the switch comes back to "OFF" position. In a scenario, where no toilet use conditions are observed, the switch is in "OFF" position. The said push switch (805) may work in a way that when the switch is in "OFF" position, all electronic circuits are in sleeping mode to save power and enhance battery use duration.

In yet another embodiment of the present invention, the said lavatory equipment (100) may comprise a pulse oximeter unit (204) connected to the microcontroller unit (106) by at least one registered jack unit male (1102) and a registered jack unit female connector (1101).

Referring to FIG. 11A, in one embodiment, the pulse oximeter unit (204) may be directly affixed to a RJ11 female jack end of the microcontroller unit (106) via a RJ11 male jack (1101, 1102), enabling measurement of pulse and oxygen level of a subject directly from the microcontroller unit (106) of the lavatory equipment.

Referring to FIG. 11B, in another embodiment, the pulse oximeter unit (204) may be positioned above the seat ring (104) in such way that, it enables measurement of pulse from either side of the seat (101) with help of a swing string (1104). The pulse oximeter (204) may be attached to a RJ11 female jack end of the swing string (1104) via RJ11 male jack (1101, 1102). The said swing string (1104) may be configured to swing from a left side of the seat ring (104) to the right side of the seat ring (104), enabling easy access of the said pulse oximeter (204) to the user measurement of pulse and oxygen level of a subject from either side of the toilet seat (101).

In still another embodiment of the present invention, the said lavatory equipment (100) may comprise a fingerprint sensor (205) configured to identify the user and to store a user specific data. The said fingerprint sensor (205) may also be integrated with the pulse oximeter unit (204), enabling identification of the user and storing the readings of the plurality of sensors for an identified user.

In yet another embodiment of the present invention, again referring to FIG. 1-4, The said lavatory equipment may comprise the seat ring (104) mounted over the toilet seat (101), wherein the seat ring (104) is attached to a rotatable axis rod (408) enabling swing from a horizontal position to vertical position wherein the seat ring (104) is attached to a rotatable axis rod (408) (as can be seen from FIG. 4B) enabling swing from a horizontal position to vertical position.

In one scenario, where a user requires to utilize the lavatory equipment (100) solely for urination or defecation without enabling assessment of vital parameters, the user or a caregiver may swing the seat ring (104) to a vertical position with the help of rotatable axis rod (408). In such a scenario, the lavatory equipment (100) may operate in a power saving mode or power off mode.

In another scenario, where the user requires to use the lavatory equipment for excretion as well as to assess and monitor one or vital health parameters the user or a caregiver may swing the seat ring (104) to a horizontal position with the help of rotatable axis rod (408). In such a scenario, the lavatory equipment (100) may operate in a power ON mode to be enabled for simultaneous assessment and diagnosis of a plurality of vital parameters of human body.

The said horizontal and vertical positioning enablement of the seat ring (104) installed with a plurality of sensors (101) reduces the power consumptions of the lavatory equipment. The horizontal and vertical swing enabled by rotatable axis rod (408) to the seat ring (104) may allow the user to use the lavatory equipment (100) with reduced power consumption.

The said lavatory equipment (100) may comprise a microcontroller unit (106) enabled to store and process a data received from the plurality of sensors (201) comprising the plurality of vital parameters of human body and further comparing them with pre-standard parameters. The said plurality of sensors (201) sense the body parameters when the human body comes in contact with the same. In one embodiment the data received from the plurality of sensors (201) and pre-standard parameters are stored in a memory unit (107).

In another embodiment of the present invention, the said lavatory equipment (100) may further comprise a display unit (108) enabled for displaying the measured vital parameters values and providing voice enabled interactive information to a user. The results communicated to the user via a voice enabled interactive information are displayed via interface (210). The interface (210) may further be connected to a transmitter (111). The sensors (201) measure vital human body parameters, which are transmitted to a transducer connected thereto via sensor leads (407). The transducer converts it to analog/electrical signal. The analog signal is converted to digital signal by ADC (analog to digital converter). In one embodiment, the ADC may be provided separately, alternatively it can be in built with a microcontroller unit (106).

In one embodiment, the microcontroller unit is implemented to store received data, which is processed and compared with standard data for communicating the same to a monitoring unit like PC audio/video alarm for caregivers(s) of the user. The said display unit (108) may be positioned at a height of 3-6 ft and preferably 5 ft, enabling viewing comfort to the user or the caregiver. The display unit (108) is enabled to provide an instant reading of the vital parameters. The display unit (108) may further comprise a plurality of compartments having different color display for one or more vital parameters. The display unit (108) is further configured to provide an audio information via an interactive audio unit (not shown in figure). The display unit (108) may be any of an interactive digital display unit wired/wirelessly connected to the lavatory equipment (100) as depicted in FIG. 1, a mobile device, a laptop, or a smartphone device having a display functionality.

In one embodiment, the display unit (108) is connected to said microcontroller unit (106) installed with a communication mechanism to transmit the data to said monitoring unit such as caregiver device (116) by means of a transmitter antenna. The monitoring unit includes audio/visual alarm, mobile, server, PC, ambulance. The antenna of said display unit (108) forwards data to wi-fi receiver antenna (110) for transmitting the data to the monitoring unit. The transmitter antenna may be enabled as a Bluetooth, wi-fi, NFC, ethernet, wired/wireless communication antenna. The said display unit may be connected with the microcontroller unit (106) enabling the display of the plurality of vital parameters of human body. The said display unit (108) is configured to provide an audio message to the user with help of a virtual assistant.

In another embodiment of the present invention, a power supply adapter unit is enabled for receiving domestic A.C power supply along with a small battery unit enabling power backup for a predefined time of at least for 30 mins. The said small battery unit is configured for auto-charging and providing power back-up in case of power failure. The small battery unit may be an AA, AAA, primary or secondary battery unit. The said small battery unit may be in the form of big storage cell fixed in the microcontroller unit (106) and can be charged after a certain period of time i.e., 2-4 months.

In yet another embodiment of the present invention, referring to FIG. 8A, FIGS. 11A and 11B, the said lavatory equipment may comprise an emergency push button (1103) and/or an emergency alarm switch (802) and attached to the microcontroller unit (106) at a predefined height of 1-2 feet from a floor. The said switch may be pushed by the user in case of an emergency. In one implementation, if a user steps or falls into a bathroom and fractures his/her bone or slips and unable to stand. The user may crawl on the floor to reach the toilet seat and press emergency push button (1103) being only 1-2 feet higher from ground/floor of the bathroom.

In one embodiment, emergency push button/lever (1103) is a push type bright red button identifiable even when the user is semiconscious. The said Emergency push button (1103), when pushed, may be configured to activate emergency alarm switch (802). When the emergency push button (1103) is pressed by a user, the local inhouse/inbuilt alarm (802) may be switched ON and simultaneously a text/SMS/Email/auto generated emergency call may be sent to two or more caregivers and emergency contacts stored in the memory (107) of the lavatory equipment through a wireless/wired signal, IPT, Wi-Fi or similar communication signal. The said emergency push lever (1103) is a distress button for any emergency added to the microcontroller unit (106), and when the emergency push lever/switch (1103) is pressed by the user, an automatic message is sent to a monitoring device of a caregiver (116). In one embodiment, the said emergency alarm (802) may be configured to recognize voice commands. In such scenario, if the user uses a preregistered voice command such as crying three times as 'Help, Help, Help', the said emergency alarm (802) may get activated.

In one embodiment, referring to FIG. 8B, the lavatory equipment (100) as described in the present invention comprises of a proximity sensor (806). The proximity sensor (806) is placed in at the back of toilet seat i.e., in the microcontroller (106) as shown in FIG. 8B. As the user seats on the toilet seat, the proximity sensor detects the presence of the user. The proximity sensor is configured to detect stay time of user on the toilet seat on each use. In another embodiment, the microcontroller unit (106) is also configured to convey readings of other vital parameters of users e.g., temperature, pulse, and $SpO_2$ along with "overstay alert" to identify immediate logical reason for an overstay alert.

In yet another embodiment, referring to FIG. 8A, the lavatory equipment (100) as described in the present invention may comprise of an emergency alarm switch (802) connected to a regular AC supply (808) through the rectifier (801) under normal conditions. Under abnormal conditions, electric power is not available from service providers. Under such conditions, a chargeable d. c. cell (803) is available as backup to operate distress call operations and other emergency power needs. The functioning of emergency alarm (802) switch is not affected by A.C power failure.

The instant invention is further described by the following experimental section:

EXAMPLES

Example 1

The lavatory equipment (100) as described in the present invention may comprise a weight sensor unit (202) for weight measurement of an individual/user. The weight sensor unit (202) is connected to the microcontroller (106). The lavatory equipment (100) is configured to display weight variation parameters on a digital display device (108) such as mobile, and laptop etc. The weight sensor unit (202) may also be configured for sending out indication to a device of a caretaker for further analysis.

Method

Figure 5A:
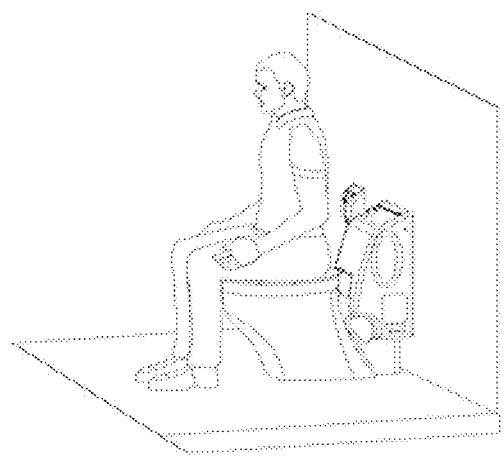
FIG. 5A-5D depicts a mechanism of measurement and analysis of a weight of the user while seating on a toilet seat (104) of the lavatory equipment (100), in accordance with an embodiment of the present invention.

The said lavatory equipment (100) comprising the weight sensor unit (202) follows a specific mechanism of determining weight components of the user. When a user sits on a toilet ring, his/her feet are naturally resting on floor. Therefore, the user cannot be considered to put his weight on the toilet ring. The measurement of weight applied on a toilet ring may cause error. Therefore, a modified mechanism is followed while sensing the weight components of the user via the weight sensor unit (202). The working of the weight sensor unit (202) is configured to follow one or more steps such as:

Step 1: Referring to FIG. 5A, a user/person is advised to seat on a toilet seat (101) of the lavatory equipment.

Figure 5B:
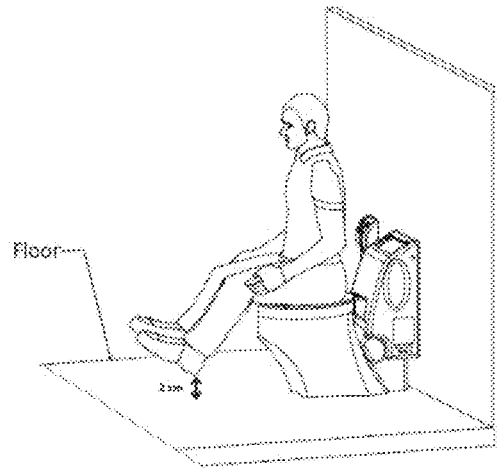
Figure 5C:
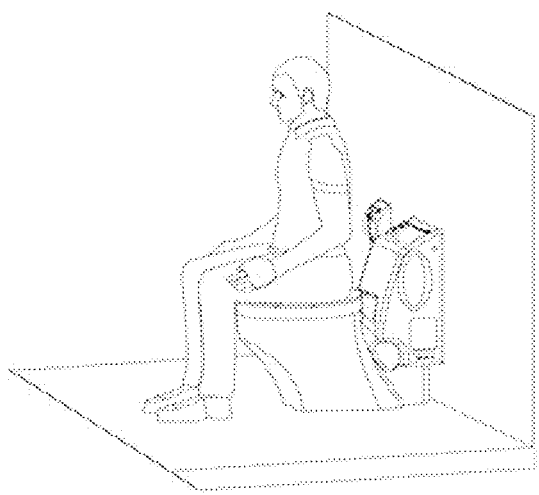
Figure 5D:
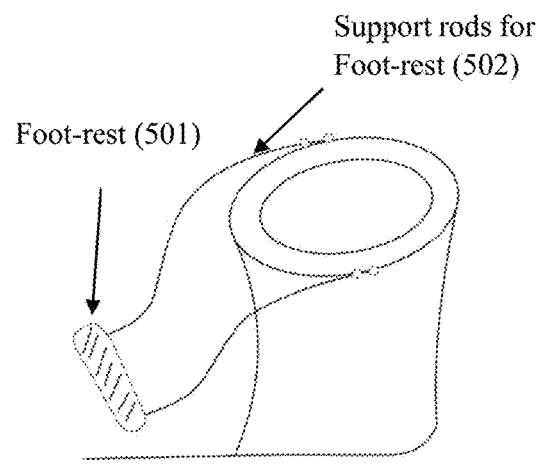

Step 2: The user lifts both the feet as illustrated in FIG. 5B above the floor for few seconds only. The user may place his/her hands on the toilet seat ring to maintain balance and comfort. The user may also place his/her feet on the footrest (501) connected to a toilet seat ring with help of support rods (502) as illustrated in FIG. 5D.

Step 3: After completing the defecation/excretion the user can again place his/her feet on the stand shown in FIG. 5C.

Step 4: Before leaving, again the user may lift the feet above the floor for few seconds. The user further lifts his/her feet for measuring body weight as illustrated in FIG. 5C.

In an Example, the user is enabled to lift his/her feet by few inches twice for measuring both body weight and body discharge. In an embodiment, the total weight of user may be calculated as sum of readings from all the sensors (401 to 406).

In another example the weight sensor unit (202) may comprise a total 6 sensor arrangement (401-406) bearing the total weight of user. Referring to a flowchart of FIG. 7 and appended table 1 below, a total weight calculation of the user sitting on a toilet seat of the lavatory equipment (100) using the weight sensor unit (202) is described:

| S. No. | Sensor | Measurement |
| --- | --- | --- |
| 01 | 401 | 15 $kg_{wt}$ |
| 02 | 402 | 12 $kg_{wt}$ |
| 03 | 403 | 15 $kg_{wt}$ |
| 04 | 404 | 12 $kg_{wt}$ |
| 05 | 405 | 15 $kg_{wt}$ |
| 06 | 406 | 12 $kg_{wt}$ |

Total Weight = 85 $kg_{wt}$

The microcontroller unit (106) is configured to receive, store, and process weight data as explained below.

Step 1: The user weigh sensing is carried out after a fixed interval of time (e.g.—1 min)

Step 2: During total stay time ($T_{stay}$), weight readings are stored as given below in Table 2.

TABLE 2

| S. No. | Time (min) | Weight ($Kg_{wt}$) |
| --- | --- | --- |
| 01 | 0 | 70 |
| 02 | 1 | 72 |
| 03 | 2 | 75 |
| 04 | 3 | 70 |
| 05 | 4 | 65 |
| 06 | 5 | 60 |

TABLE 2-continued

| S. No. | Time (min) | Weight ($Kg_{wt}$) |
| --- | --- | --- |
| 07 | 6 | 60 |
| 08 | 7 | 60 |
| 09 | 8 | 71 |
| 10 | 9 | 74 |
| 11 | 10 | 60 |
| — | — | — |

(Example: $T_{stay}$=10 min.)

The above weight data of table 2 is further used to find Max. Weight, Min weight, Difference between two max peaks, avg weight etc.

Referring to FIG. 6A-6C following observations were made:

Initial Max Weight $Max_1$=75 $kg_{wt}$

Final Max Weight $Max_2$=74 $kg_{wt}$

Min weight Min=60 $kg_{wt}$

The above data is used to declare body weight of the user & body discharge (BD)

Weight of User=Max1=75 $kg_{wt}$

Body Discharge by User=$Max_1$–$Max_2$=75 $kg_{wt}$–74 $kg_{wt}$=1 $Kg_{wt}$

Referring to Table 2, all the 11 readings (considering $T_{stay}$=10 min) are stored on ad-hoc basis for short duration of few minutes and automatically deleted.

Desired readings e.g. $(Max)_1$, $(Max)_2$, (Min), Body discharge (BD) etc. are stored for a longer duration in memory (107) for few months.

Display

The user display values are:

| S. No. | Display Parameters | Value (in $kg_{wt}$) |
| --- | --- | --- |
| 01 | Body Weight | 75 $kg_{wt}$ |
| 02 | Body Discharge | 1 $kg_{wt}$ |

The values are displayed on the display panel (108) near the toilet seat and easily readable/audible by the user visibility position (303) just after toilet seat use. These values are displayed on the display panel within few seconds of the user leaving the toilet seat. The display panel is at user eye level when the user is in standing as shown in FIG. 3A-3B.

Analytics Alert in Mobile Application

The microcontroller unit (106) of the lavatory equipment is further configured to analyze the data and informed to the caregiver, user, physician, and laboratory through wired/wireless communication. In one embodiment, entire data may be transferred to mobile app created for this purpose. Table 3 represents details of weight data monitored through a corresponding mobile application.

TABLE 3

| S. No. | Day and Time | Weight | Discharge | Time Stay |
| --- | --- | --- | --- | --- |
| 01 | Day 1 (8:10:22) | 74.6 $kg_{wt}$ | 1.0 $kg_{wt}$ | 10 min |
| 02 | Day 2 (8:00:01) | 74.5 $kg_{wt}$ | 0.9 $kg_{wt}$ | 11 min |
| 03 | Day 3 (8:19:06) | 74.4 $kg_{wt}$ | 0.8 $kg_{wt}$ | 11 min |
| 04 | Day 4 (8:10:0) | 74.3 $kg_{wt}$ | 0.9 $kg_{wt}$ | 10 min |

TABLE 3-continued

| S. No. | Day and Time | Weight | Discharge | Time Stay |
|---|---|---|---|---|
| 05 | Day 5 (8:18:17) | 74.2 $kg_{wt}$ | 0.7 $kg_{wt}$ | 12 min |
| 06 | Day 6 (8:00:00) | 74.1 $kg_{wt}$ | 0.8 $kg_{wt}$ | 13 min |
| 07 | Day 7 (8:16:20) | 74 $kg_{wt}$ | 0.9 $kg_{wt}$ | 12 min |
| 08 | Day 8 (8:013:02) | 73.9 $kg_{wt}$ | 1.0 $kg_{wt}$ | 14 min |
| 09 | Day 9 (8:10:01) | 73.8 $kg_{wt}$ | 0.9 $kg_{wt}$ | 14 min |
| 10 | Day 10 (8:00:00) | 73.7 $kg_{wt}$ | 0.8 $kg_{wt}$ | 15 min |

Referring to FIG. 6A-6C and table 3, a variation of weight is analyzed for daily weight v/s day and further stored in a user data to analyze history and trends in weight variation and total discharge of the user.

In an example, the body discharge values are also displayed on the said mobile application in same format of FIG. 6C, but not shown in figure. Regular decrease or increase in weight & body discharge is taken as alert and informed to the user as it may be a symptom of some diseases.

In an example, the said external system connected to the microcontroller unit (106) is configured to store, display, and measure a stay time ($T_{stay}$) of the user on a lavatory equipment. The stay time ($T_{stay}$) of a user can be measured on a daily basis.

In another embodiment, the user can feed a stay time limit as an input data in the mobile Application. A default stay time can be set to any value. In one case the default stay time is 40 mins. If on any day, the user's stay time is more than 40 mins default time, an alert can be sent to caretaker/physician device (112, 113, 114) through a notification system such as email or SMS. The notification is configured to alert the caretaker/physician device (114) that the lavatory equipment user needs an attention as the user's stay time has exceeded than the predefined stay time. In one embodiment, an audio/visual alarm (110) is kept ON informing nearby caretakers in case stay time is more than the stay time limit.

In another embodiment, the microcontroller unit (106) is also configured to convey readings of other vital parameters of users e. g. temperature, pulse, and $SpO_2$ along with "overstay alert" to identify immediate logical reason for an overstay alert.

In one example, the lavatory equipment (100) may comprise a fingerprint sensor (205) as shown FIG. 16A. While lifting the feet above the floor, user can press his/her thumb/finger on a point on the upper part of the seat ring (104) for support and balance purpose. The Fingerprint sensor (205) is positioned as shown in FIG. 16A. The positioning of the fingerprint sensor may serve a dual purpose. Firstly, the user gets support to retain balance while lifting the feet in step 2 (FIG. 5B). Secondly, the user thumb/fingerprint may be used to identify the user out of many users using the same toilet seat (104).

Example 2

The lavatory equipment (100) as described in the present invention may also comprise an overstay alarm. In one embodiment, user presence on the toilet seat is detected by one or more of the following methods.

In an example, the lavatory equipment (100) may be configured to recognize the overstay by calculating recorded weight readings of all the load cells and sum of all the readings of the load cell is utilized for further calculation. If sum>=10 $kg_{wt}$, the system detects the presence of the user of the toilet seat. The lavatory equipment (100) as described in the present invention comprises of a stay time of the user on the toilet seat on each use.

In another example, to further inform the caretakers, if stay time is more than present stay time. So, it is used to activate "overstay alarm" (110) and send alerts via SMS/email/audio alarm etc. to caretaker/physician. If user stays on toilet seat for a time more than pre-set time (say 40 min.), the emergency alarm switch (802) gets activated and SMS/email/audio alarm etc. is sent to caretaker/physician. The said lavatory equipment (100) is set in an active mode i.e., full power if user presence is detected by any one method. In yet another example, if no user presence is detected, then the system is enabled to activate sleeping mode with minimum power consumption. A presence of user is checked by three possible methods discussed in weight and overstay detection process explained earlier.

Example 3

Temperature Measurement by a Lavatory Equipment (100)

In one embodiment, referring to FIG. 10, a temperature output from temperature sensor is given to ADC (105) for conversion in digital form is illustrated by a flowchart. The microcontroller (106) receives, stores, processes temperature data as explained in below table 4 and following below steps.

Step 1: User temperature sensing is done reportedly after a fixed interval of time (say 1 min).

Step 2: During total stay time ($T_{stay}$), temperature reading is stored as given below.

TABLE 4

| S. No. | Time(min) | Temperature (° F. or ° C.) |
|---|---|---|
| 01 | 0 | 98.6 |
| 02 | 1 | 98.8 |
| 03 | 2 | 98.7 |
| 04 | 3 | 98.9 |
| 05 | 4 | 98.3 |
| 06 | 5 | 98.4 |
| 07 | 6 | 98.3 |
| 08 | 7 | 98.5 |
| 09 | 8 | 98.4 |
| 10 | 9 | 98.7 |
| 11 | 10 | 98.8 |

(Example: $T_{stay}$=10 min)

The above temperature data is used to find Maximum Temperature, Minimum temperature, Average temperature, etc. The graph for above body temperature data is shown in FIGS. 9A and 10.

The above temperature data is used to find Maximum body Temperature, Minimum body temperature, and Average body temperature of the user. All the 11 readings (During stay time of 10 min) are stored on an ad-hoc basis. Display Referring to FIGS. 9B and 9C individual temperature values of the user are displayed on the display device (108).

TABLE 5

| S. No. | Display Parameter | Value (° F. or ° C.) |
|---|---|---|
| 01 | Temperature | 98° F. |

Referring to FIGS. 2, 10, and 9B-9C, the temperature values are displayed on the display panel in easily readable/audible format to the user just after toilet seat use. These values may be displayed on the display panel within a few seconds of the user leaving the toilet seat.

Analytics, Alerts, in Mobile Application

Through wired/wireless communication, entire recorded temperature data is stored, analysed, and transferred to mobile application created for this purpose via a microcontroller unit (106) of the lavatory equipment (100).

TABLE 6

| S. No. | Day and Time(min) | Temperature (° F.) |
|---|---|---|
| 01 | Day 1 (8:10:22) | 9.6 |
| 02 | Day 2 (8:20:01) | 96.8 |
| 03 | Day 3 (8:16:20) | 98.7 |
| 04 | Day 4 (8:10:00) | 97.9 |
| 05 | Day 5 (8:14:11) | 98.3 |
| 06 | Day 6 (8:11:02) | 98.4 |
| 07 | Day 7 (8:13:00) | 98.3 |
| 08 | Day 8 (8:10:09) | 98.5 |
| 09 | Day 9 (8:11:12) | 99.4 |
| 10 | Day 10 (8:10:24) | 100 |

Variation of temperature is analyzed, and graph is plotted (FIG. 9A) for daily temperature v/s Day. The temperature reading, out of preset temperature range, is taken as alert and informed to the user as it may show that the person is not well as parameters are beyond permissible limits of 96° F.-100° F.

Method

Step 1: The user is advised to sit on a toilet seat ring with both feet touching the floor as illustrated in FIG. 4A.

Step 2: User should sit at a fix distance from the temperature sensor almost constant distance should be maintained for accurate temperature readings.

For contact type temperature sensors (1601 in FIG. 16A), human body part must touch contact type temperature sensor fitted on the toilet seat ring (104) or footrest (501 in FIG. 5D).

Example 4

Pulse Measurement
System

Figure 12A:
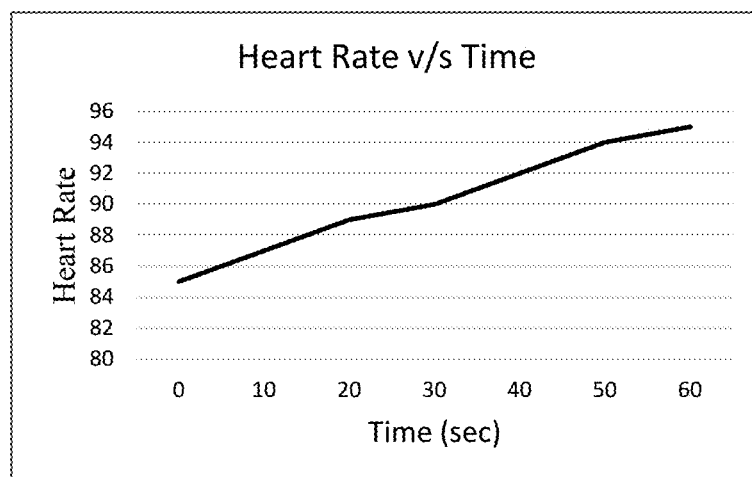
FIG. 12A-12C depict a heart rate v/s time graph based on working of the Pulse Oximeter (204), and the corresponding display of pulse measured for one or more users on a display device, in accordance with an embodiment of the present invention.
Figure 12B:
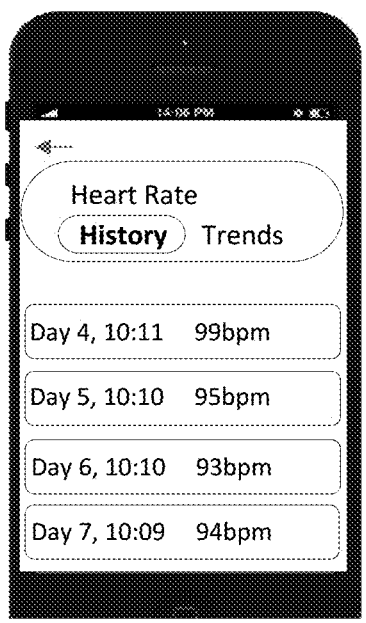
Figure 12C:
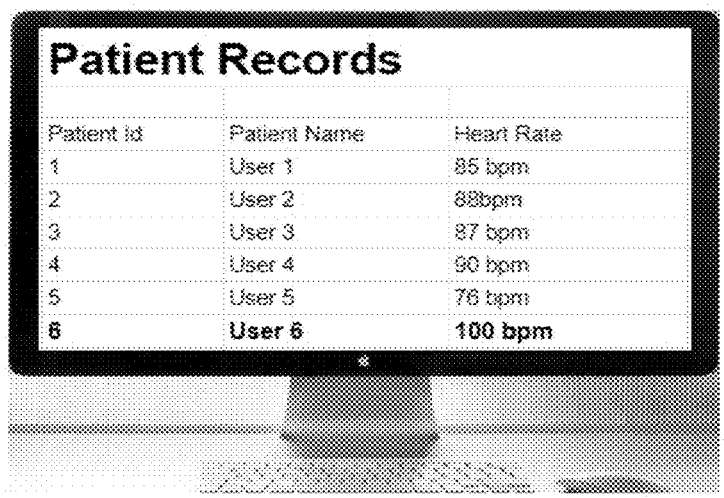

As illustrated in FIG. 12A-C and pulse flowchart in FIG. 13, a measurement of user pulse through the lavatory equipment (100) is carried out by a pulse oximeter, and further analysis of pulse variation parameters based on measurement is displayed on a device such as mobile, laptop, etc. information and is alerted to caretaker.

Method

The pulse oximeter is fitted to the toilet seat as shown in FIGS. 11A and 11B. The user is instructed to put his index or middle finger in the pulse oximeter for about a minute.

Placement and Position of Oximeter

The user inserts his/her finger in clamp sensor which can be connected to any one of the connections RJ11 which can have fitment locations (1101) as shown in FIG. 11A or 11B.

Signal Processing and Data Recording

Referring to FIG. 2A, pulse output from the pulse-oximeter sensor (204) is given to Analog to Digital Convertor (ADC) (105) for conversion to digital form. The microcontroller (106) receives, stores, processes data as explained below.

Step 1: User pulse and SpO$_2$ sensing is done for about a minute till the reading stabilizes.

Step 2: During total time for which the user measures his pulse, readings are stored as given below.

TABLE 7

| S. No. | Time(sec) | Pulse (bpm) |
|---|---|---|
| 01 | 0 | 85 |
| 02 | 10 | 87 |
| 03 | 20 | 89 |
| 04 | 30 | 90 |
| 05 | 40 | 92 |
| 06 | 50 | 94 |
| 07 | 60 | 95 |

The Graphical analysis of for above pulse measurement data is depicted in FIG. 12A.

Display

The user display values are:

TABLE 8

| S. No. | Display Parameter | Value (bpm) |
|---|---|---|
| 01 | Heart Rate | 90 bpm |

Analytics, Alerts in Mobile Applications

Through wired/wireless communication, all the data is transferred to mobile application created for this purpose.

TABLE 9

| S. No. | Day and Time | Heart Rate |
|---|---|---|
| 01 | Day 1 (8:10:22) | 78 bpm |
| 02 | Day 2 (8:00:01) | 76 bpm |
| 03 | Day 3 (8:14:01) | 80 bpm |
| 04 | Day 4 (8:00:00) | 84 bpm |
| 05 | Day 5 (8:18:09) | 82 bpm |
| 06 | Day 6 (8:11:01) | 90 bpm |
| 07 | Day 7 (8:15:07) | 89 bpm |
| 08 | Day 8 (8:00:20) | 98 bpm |
| 09 | Day 9 (8:11:02) | 100 bpm |
| 10 | Day 10 (8:12:10) | 102 bpm |

In one embodiment, the measurement of value equal to or above 102 bpm on a particular day is taken as alert (permissible range is considered between 50 bpm to 120 bpm). In another embodiment, variation of pulse is analyzed, and graph is plotted for Daily heart rate v/s day or date. Rise in heart rate is taken as alert and informed to the user as it may show that the person is not well.

Method

Step 1: User to sit on a toilet seat with both feet touching the floor.

Step 2: An oximeter is fitted at the back of the toilet seat. It is attached with a string (1104) so that user can easily access it. User will put his index or middle finger in the pulse-oximeter clamp sensor for about a minute.

Step 3: The user can further keep the pulse-oximeter steady for above a minute till the reading on the pulse oximeter is stable.

Step 4: The user can check the final stable reading and remove the pulse-oximeter.

Example 5

$SpO_2$ Measurement
Method

As illustrated in FIG. 14A-14C, and $SpO_2$ flowchart of FIG. 15, the Pulse oximeter is configured to measure $SpO_2$ by following below steps:

Step 1: A user is advised to sit on a toilet ring

Step 2: An oximeter is fitted at the back of the toilet seat. The user is advised to put his/her index finger, middle finger in the oximeter for about a minute.

System for $SpO_2$ Measurement

The pulse oximeter unit (204) is connected to the microcontroller unit and may be positioned in such a way that the oximeter enables measurement of $SpO_2$ from either side of the seat with help of a string swing. An arrangement of the oximeter unit is such that the oximeter can measure the $SpO_2$ values while sitting on the toilet seat.

Connections

A final $SpO_2$/oxygen level of the user is proportional to the stable reading shown by the oximeter after predefined period of 1 min.

Method

Step 1: A user is advised to sit on a toilet seat ring with both feet touching the floor.

Step 2: A pulse-oximeter is fitted at the back of the toilet seat. The pulse-oximeter is attached with a string so that the user can easily access the pulse oximeter.

Signal Processing and Data Recording

An $SpO_2$ output from the oximeter is given to analog to digital convertor (ADC) for conversion to digital form. The microcontroller unit (106) is configured to receive, store, and process the data as described in below steps:

Step 1: A user oxygen level sensing is done for about a minute till the reading stabilizes.

Step 2: During total time for which the pulse oximeter measures an oxygen level of user, the $SpO_2$ readings are as described in Table 10.

TABLE 10

| S. No. | Time(sec) | SpO2 (%) |
|---|---|---|
| 01 | 0 | 96 |
| 02 | 10 | 97 |
| 03 | 20 | 99 |
| 04 | 30 | 96 |
| 05 | 40 | 99 |
| 06 | 50 | 98 |
| 07 | 60 | 97 |

The above $SpO_2$ data as shown in table 10 is used to find maximum oxygen level, and minimum oxygen level of the user. A graph of above data is plotted and depicted as shown in FIG. 14A.

Display

The pulse oximeter unit (204) is connected to the user display device or may be configured with an inbuilt display unit (108).

TABLE 11

| S. No. | Display Parameter | Value (%) |
|---|---|---|
| 01 | $SpO_2$ level | 98% |

These values are displayed on the display panel (108) near the toilet seat and easily readable/audible by the user a few minutes after the toilet seat use. These values are displayed on the display panel within a few seconds of the user leaving the toilet seat.

Analytics

Through a wired/wireless communication, all data is transferred to a mobile application created for the analysis purpose. In one embodiment, the said lavatory equipment (100) may integrated with a system comprising a wired/wireless communication system.

Referring to FIGS. 14B and 14C, the said communication system is configured to display the oxygen level/temperature as described in the Table 12.

TABLE 12

| S. No. | Day and Time | Temperature |
|---|---|---|
| 01 | Day 1 (8:10:22) | 99% |
| 02 | Day 2 (8:00:01) | 98% |
| 03 | Day 3 (8:14:01) | 98% |
| 04 | Day 4 (8:00:00) | 97% |
| 05 | Day 5 (8:18:09) | 97% |
| 06 | Day 6 (8:11:01) | 96% |
| 07 | Day 7 (8:15:07) | 95% |
| 08 | Day 8 (8:00:20) | 95% |
| 09 | Day 9 (8:11:02) | 95% |
| 10 | Day 10 (8:12:10) | 94% |

In one embodiment, the oxygen level measurement such as 94% on a particular day may be considered as an alert (permissible value>=94%). A variation of oxygen level is analyzed and drop in oxygen level is taken as alert and further configured for alarming to the user as the reading of 94% may considered as a threshold to determine that the user is unwell.

Example 6

The lavatory equipment (100) comprises an ECG unit (207) comprising one or more ECG electrodes as illustrated in FIG. 16A-16E.

Method

Plotting and analyzing ECG from the ECG unit (207) comprises a predefined step route. The ECG unit (207) is configured to perform an ECG analysis through one or more ECG electrodes, amplifier and the microcontroller unit. The one or more steps may involve:

Step 1: The user is advised to sit on a toilet seat ring

Step 2: measuring an ECG of the user through seat ring (104) mounted ECG electrodes 207A, 207B, 207C, 207D as depicted in FIG. 16A. The ECG electrodes 207A, 207B, 207C, 207D are configured to pick electrical signal from thighs of the user as thighs are in contact with the electrodes. In a scenario, wherein the electrical signals received from thighs are weak, an amplifier unit with noise reduction capabilities is enabled to amplify and process the signals.

Step 3: The microcontroller unit (106) is configured to analyze the signals to determine Heart rate, irregularities in ECG when compared to normal ECG of the user.

Step 4: Informing the user/caretaker about abnormal heart rate and ECG irregularities, if any.

Placement and Positioning of Electrodes

Connections

As shown in FIG. 16B, the ECG electrodes 207A, 207B, 207C, 207D, 207E, 207F are connected to the amplifier (1602). In one embodiment, the amplifier may be selected as AD 8232 chip connected through a coupler.

Signal Processing and Data Recording

The bioelectrical signal from thighs is given to amplifier and further to analog to digital convertor (ADC) for conversion to digital form. The microcontroller receives, stores, and processes data as explained below.

Step 1: The user sits on the toilet ring making good contact with EGC electrodes mounted on a toilet seat ring (104) as shown in FIG. 16A.

Step 2: The ECG readings are taken intermittently (e.g.—3 min OFF, 1 min ON for ECG)

Step 3: The microcontroller unit (106) is configured to store 1 min ON ECG reading data. Further, 3 ECG readings can be availed for the user sitting on a toilet seat for 15 minutes. Thereby, 3 different heart rate readings may be taken from the intermittent ECG readings and are stored in the following manner in a microcontroller or server.

The following Table 13 describes intermittent ECG reading pattern.

TABLE 13

| S. No. | Time(min) | Heart Rate |
|---|---|---|
| 01 | 0 to 3 Min | NO ECG |
| 02 | 3 to 4 Min | ECG 1 |
| 03 | 4 to 7 Min | NO ECG |
| 04 | 7 to 8 Min | ECG 2 |
| 05 | 8 to 11 Min | NO ECG |
| 06 | 11 to 12 Min | ECG 3 |
| 07 | 12 to 15 Min | NO ECG |

In one scenario, referring to table 13 wherein a lowest and highest average heart rate may be transferred and displayed on the mobile Application. All the ECG readings taken at the time of lavatory equipment use may be further stored and used for analysis of the health condition of the user by the caregiver.

In another scenario, wherein one ECG reading is taken by the ECG unit when the weight passes through the maxima. The microcontroller will take care of this logic i.e. to take ECG for 1 minute whenever weigh reading passes through a maxima.

Display

The following Table 14 describes intermittent ECG reading pattern observed over a display unit (108).

TABLE 14

| S. No. | ECG | Heart Rate |
|---|---|---|
| 01 | ECG 1 | 70 |
| 02 | ECG 2 | 72 |
| 03 | ECG 3 | 74 |

In the table 9, minimum heart rate measured is 70, maximum heart rate measured is 72, and an average heart rate is 72. In one embodiment, the lavatory equipment (100) may enable clicking on any of the ECG electrode unit to, view, store and send ECG to any digital assistant device. In another embodiment, the user can send all ECGs to a caretaker by default whenever the user uses the toilet seat.

Example 7

Practical Circuit Enablement of the Bioactive Integrated Sensor

In an embodiment, a practical circuit along with major components is shown in FIG. 17. The circuit arrangement is to enable working of weight measurement, temperature, overstay alarm, pulse, $SpO_2$, emergency alarm switch, etc. Other measurements e.g.—blood pressure, and blood glucose level may also be enabled via same circuit arrangement and processors. Referring to FIG. 17, in an embodiment, the circuit arrangement includes a microcomputer (e.g., Raspberry Pi) and microcontroller (e.g., Arduino Nano) for weight sensing, temperature sensing and emergency switch operation. FIG. 17 further depicts all connection arrangements to execute the invention and also the display module circuit arrangement. It should be noted that other parameter measurements e.g., pulse, SpO2, ECG, blood glucose, blood pressure is also executed by using the similar arrangement as shown in FIG. 17.

The said lavatory equipment (100) as described in the present invention provides following non-limiting advantages:

Single point solution for assessment of vital parameters such as body weight, temperature, pulse, and oxygen level of the user Smart and optimized battery consumption Ergonomically user friendly easy to operate positioning of the plurality of sensor components In accordance with the embodiments of the present invention, the disclosed lavatory equipment (100) may further be used in multiple applications including but not limited to:

Geriatric care

Cognitive care

Household health monitoring etc.

The embodiments, examples, and alternatives of the preceding paragraphs or the description and drawings, including any of their various aspects or respective individual features, may be taken independently or in any combination thereof. Features described in connection with one embodiment are applicable to all embodiments unless such features are incompatible.

The invention claimed is:

1. A lavatory equipment (100) enabled for simultaneous assessment and diagnosis of a plurality of vital parameters of human body, the lavatory equipment (100) comprising:
   a toilet seat (101) installed with a plurality of sensors (201) to measure and assess the plurality of vital parameters of human body;

a seat ring (104) mounted over the toilet seat (101), wherein the seat ring (104) is attached to a rotatable axis rod (408) enabling swing from a horizontal position to a vertical position;

a microcontroller unit (106) configured to
store and process data received from the plurality of sensors (201), the said data comprising a plurality of vital parameters of human body, and
compare the plurality of vital parameters with pre-standard parameters;
a display unit (108) configured to display the measured vital parameters values and providing voice enabled interactive information to a user; and
an emergency push switch (802) attached to the microcontroller unit (106) at a predefined height;
wherein the plurality of sensors (201) comprise
a weight sensor unit (202) comprising a plurality of load cells (401, 402, 403, 404), and positioned symmetrically on the seat ring (104) to bear total weight of a human body, and is connected to a multi-pin connector (407) which is affixed to the microcontroller unit (106) via a plurality of leads, wherein the weight sensor unit (202) is configured to record and analyze total discharge of the user;
an IR temperature sensor (203), wherein the IR temperature sensor (203) is affixed to the microcontroller unit (106) above a water jet (807) at a predefined height, a pulse oximeter unit (204) connected to the microcontroller unit (106) by at least one registered jack unit male (1102) and a registered jack unit female connector (1101), wherein the pulse oximeter unit (207) is positioned in such way that, it enables measurement of pulse from either side of the toilet seat (101) with help of a swing string (1104),
a finger-print sensor (205),
an ECG electrode unit (207) positioned on the seat ring (104), wherein the ECG electrode unit (207) comprises ECG electrodes 207A, 207B, 207C, 207D and ECG electrodes 207E, 207F positioned on a footrest 501;
a blood glucose sensor (208), and
a blood pressure sensor (209).

2. The lavatory equipment as claimed in claim 1, wherein the lavatory equipment (100) ensures timely recording of the plurality of vital parameters of human body comprising at least a body temperature via the IR temperature sensor (203), a body weight via the weight sensor (202), a pulse via the pulse oximeter unit (204), ECG parameters via the ECG electrode unit (207), a blood glucose level via the blood glucose sensor (208), and a blood pressure via the blood pressure sensor (209).

3. The lavatory equipment as claimed in claim 2, wherein the display unit (108) is configured to display the plurality of vital parameters of the human body comprising at least the body temperature via the IR temperature sensor (203), the body weight via the weight sensor (202), and the pulse via the pulse oximeter unit (204) ECG parameters via the ECG electrode unit (207), a blood glucose level via the blood glucose sensor (208), and a blood pressure via the blood pressure sensor (209).

4. The lavatory equipment as claimed in claim 3, wherein the display unit (108) is further configured to provide an audio message to the user with help of a virtual assistant.

5. The lavatory equipment as claimed in claim 1, wherein microcontroller unit (106) is positioned above a water storage unit (102) unit of the lavatory equipment (100).

6. The lavatory equipment as claimed in claim 1, wherein the fingerprint sensor (205) is integrated with the pulse oximeter unit (204), enabling identification of the user and storing the readings of the plurality of sensors for an identified user.

7. The lavatory equipment as claimed in claim 1, wherein the emergency push switch (802) is a distress button added to the microcontroller unit (106) for any emergency, and when the emergency push switch (802) is pressed by the user, the microcontroller unit is configured to send an automatic message to a monitoring device (112, 113, 114) of a caregiver.

8. The lavatory equipment as claimed in claim 1, wherein the ECG electrode unit is connected to an amplifier unit (1602).

9. The lavatory equipment as claimed in claim 1, wherein the blood glucose sensor (208) is a non-invasive sensor.

10. The lavatory equipment as claimed in claim 1, wherein the lavatory equipment comprises an electromechanical push switch (805) integrated with the weight sensor unit (202), wherein the electromechanical push switch (805) is capable of being switched "ON"/"OFF", and wherein the switching OFF of the electromechanical push switch (805) triggers in activating a sleep mode of the microcontroller unit (106) and other electronic components of the equipment (100).

11. The lavatory equipment as claimed in claim 1, wherein the lavatory equipment comprises a proximity sensor (806) placed in at the back of toilet seat for detecting a presence of the user, wherein the proximity sensor (806) is configured to switch ON and switch OFF the microcontroller unit (106) and the sensor unit (201) based on a proximity of the user, wherein the proximity sensor (806) is configured to detect a stay time of the user in the toilet seat on each use.

12. The lavatory equipment as claimed in claim 1, wherein the microcontroller unit (106) is configured to determine an overstay of a user by analyzing the vital parameters of user and to switch ON the emergency alarm switch 802.

13. The lavatory equipment as claimed in claim 1, wherein the microcontroller unit (106) is communicatively coupled with a caregiver device (116) via a central server (109), wherein the caregiver device (116) is configured for receiving a health condition data of the user.

14. The lavatory equipment as claimed in claim 13, wherein the caregiver device (116) accesses a mobile and/or web application stored on the central server (109) enabled for displaying the health condition data of the user.

15. The lavatory equipment as claimed in claim 1, wherein the weight sensor unit (202) is communicatively coupled with the microcontroller unit (106) and configured to determine a total body discharge and a user body weight by carrying out steps comprising:
determining (1801) a user seating on a toilet seat (101) while putting feet on the toilet floor and recording first user weight value;
sensing (1802) a second user weight value when a user has lifted the feet above a floor for few seconds at first time;
determining (1803) a third user weight value after completing a defecation/excretion and when a user places the feet on the toilet floor for a second time;
determining (1804) a fourth user weight value when a user lifts the feet by few inches above the floor before leaving for measuring body weight; and
determining and recording (1805) the user body weight and the total body discharge weight of the user.

16. The lavatory equipment as claimed in claim 15, wherein the first, second, third and fourth user weight values are calculated and determined from the weight sensor unit (202) comprising six weight sensor arrangement (401-406) bearing the total weight of the user.

\* \* \* \* \*